United States Patent
Yang et al.

(10) Patent No.: US 12,057,763 B2
(45) Date of Patent: Aug. 6, 2024

(54) POWERTRAIN AND ELECTRIC VEHICLE

(71) Applicant: Huawei Digital Power Technologies Co., Ltd., Shenzhen (CN)

(72) Inventors: Shaobo Yang, Dongguan (CN); Jiangang Wang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 270 days.

(21) Appl. No.: 17/845,165

(22) Filed: Jun. 21, 2022

(65) Prior Publication Data

US 2022/0320962 A1 Oct. 6, 2022

(30) Foreign Application Priority Data

Jun. 22, 2021 (CN) .......................... 202110692961.3

(51) Int. Cl.
*H02K 9/19* (2006.01)
*B60K 1/00* (2006.01)
*B60K 11/02* (2006.01)

(52) U.S. Cl.
CPC ................. *H02K 9/19* (2013.01); *B60K 1/00* (2013.01); *B60K 11/02* (2013.01); *B60K 2001/006* (2013.01)

(58) Field of Classification Search
CPC ....................................................... H02K 9/19
See application file for complete search history.

(56) References Cited

U.S. PATENT DOCUMENTS

| 11,114,921 | B2 * | 9/2021 | Ito .......................... F16H 57/045 |
| 11,578,798 | B2 * | 2/2023 | Nakata ................ F16H 57/0483 |
| 11,608,884 | B2 * | 3/2023 | Inoue ....................... H02K 9/19 |
| 11,828,358 | B2 * | 11/2023 | Nakata ................ F16H 57/0424 |
| 2019/0229582 | A1 * | 7/2019 | Ito ............................... B60K 1/00 |
| 2021/0039491 | A1 | 2/2021 | Merz et al. |
| 2022/0320962 | A1 * | 10/2022 | Yang ...................... B60K 11/02 |

FOREIGN PATENT DOCUMENTS

| CN | 101147014 A | 3/2008 |
| CN | 101504067 A | 8/2009 |
| CN | 102086801 A | 6/2011 |
| CN | 111565953 A | 8/2020 |
| CN | 111697743 A | 9/2020 |
| CN | 111756134 A | 10/2020 |
| CN | 111959252 A | 11/2020 |
| CN | 109474127 B | 12/2020 |

(Continued)

*Primary Examiner* — Robert W Horn
(74) *Attorney, Agent, or Firm* — Maier & Maier, PLLC

(57) ABSTRACT

A powertrain includes a motor, a reducer, an oil pan, and a cooling system. The cooling system includes at least one heat exchanger and at least two oil pumps. The at least two oil pumps are configured to deliver, to the heat exchanger, cooling oil sucked from the oil pan. The heat exchanger is configured to cool the cooling oil sucked by the at least two oil pumps. An oil outlet port of the heat exchanger is connected to an oil passage in the motor and an oil passage in the reducer, so that a part of the cooling oil cools the motor through the oil passage in the motor, and another part of the cooling oil cools the reducer through the oil passage in the reducer. The embodiments can improve a cooling effect of the cooling system for the powertrain.

20 Claims, 23 Drawing Sheets

(56) References Cited

FOREIGN PATENT DOCUMENTS

| | | | |
|---|---|---|---|
| CN | 112106281 | A | 12/2020 |
| CN | 213472767 | U | 6/2021 |
| DE | 102011076525 | A1 | 11/2012 |
| DE | 102015214309 | A1 | 2/2017 |
| DE | 102018121203 | A1 | 3/2020 |
| EP | 3517745 | A1 | 7/2019 |

* cited by examiner

POWERTRAIN AND ELECTRIC VEHICLE

CROSS-REFERENCE TO RELATED APPLICATIONS

This application claims priority to Chinese Patent Application No. 202110692961.3, filed on Jun. 22, 2021. The disclosures of the aforementioned applications are hereby incorporated by reference in their entireties.

TECHNICAL FIELD

The embodiments relate to the field of motor cooling technologies, a powertrain, and an electric vehicle.

BACKGROUND

A powertrain of an electric vehicle includes a motor and a reducer. The motor is configured to convert electric energy supplied by a power battery pack of the electric vehicle into mechanical energy. The reducer is configured to transmit the mechanical energy generated by the motor to a wheel of the electric vehicle, so as to drive the electric vehicle to run. As a power transmission component, the reducer mainly includes components such as a gear, a bearing, and a housing.

For a powertrain using oil cooling, cooling oil is mainly driven by an electric oil pump to circulate heat between the inside of the powertrain and a heat exchanger for lubrication and cooling. As a result, a motor cooling effect depends on performance of the electric oil pump and the heat exchanger.

As the powertrain continuously evolves towards miniaturization, and a maximum rotational speed of the powertrain also needs to be increased continuously, a same power output with a smaller size means that a heat density increases. In addition, miniaturization of a motor leads to a smaller oil passage for cooling oil to circulate in the motor. As a result, flow resistance of the cooling oil flowing in the oil passage is increased and a flow rate is decreased, thereby reducing a cooling effect of the cooling oil for the motor, that is, a cooling effect of a cooling system for the powertrain is poor.

SUMMARY

To resolve the foregoing problem, a powertrain and an electric vehicle may have an improved cooling system for the powertrain.

According to a first aspect, a powertrain is configured to drive an electric vehicle. The powertrain includes a motor, a reducer, an oil pan, and a cooling system. The cooling system includes at least one heat exchanger and at least two oil pumps. The at least two oil pumps are configured to deliver, to the heat exchanger, cooling oil sucked from the oil pan. The heat exchanger is configured to cool the cooling oil sucked by the at least two oil pumps. An oil outlet port of the heat exchanger is connected to an oil passage in the motor and an oil passage in the reducer, so that a part of the cooling oil cools the motor through the oil passage in the motor, and another part of the cooling oil cools the reducer through the oil passage in the reducer.

In conclusion, according to the solution provided in this embodiment, the plurality of oil pumps jointly provides required cooling oil for the powertrain, to ensure that a sufficient flow rate of cooling oil can be provided. A part of the cooling oil transmitted by the plurality of oil pumps is used to cool the motor, and another part is used to cool the reducer, to ensure good heat dissipation of the powertrain, and improve a cooling effect of the cooling system for the powertrain.

In a possible implementation, the powertrain includes one motor and one reducer, and the oil pan includes a reducer oil return port and a motor oil return port. Cooling oil for cooling the reducer enters the oil pan through the reducer oil return port, and cooling oil for cooling the motor enters the oil pan through the motor oil return port. That is, the motor and the reducer share one oil pan.

In a possible implementation, the powertrain further includes a motor control unit (MCU), and the at least two oil pumps include a mechanical oil pump and an electronic oil pump. The mechanical oil pump and the electronic oil pump each include an oil suction port, or the mechanical oil pump and the electronic oil pump share one oil suction port. Oil outlet passages of the mechanical oil pump and the electronic oil pump converge and then are connected to an oil inlet port of a same heat exchanger, or the oil outlet passages of the mechanical oil pump and the electronic oil pump are respectively connected to oil inlet ports of different heat exchangers. In the latter case, the different heat exchangers respectively cool cooling oil transmitted by the electronic oil pump and the mechanical oil pump, thereby improving a cooling effect. The mechanical oil pump is driven by a rotating component of the powertrain, and the rotating component of the powertrain includes a rotating shaft of the motor or a rotating shaft of the reducer. The reducer may include a plurality of rotating shafts. The MCU is configured to control a rotational speed of the electronic oil pump.

The mechanical oil pump is rigidly connected to a transmission component of the reducer, that is, the rotational speed of the mechanical oil pump is positively correlated to a rotational speed of the motor. Therefore, when the rotational speed of the motor increases, the mechanical oil pump correspondingly increases a flow rate of cooling oil delivered to the powertrain, to meet a cooling requirement of the powertrain. The mechanical oil pump has a smaller size and lower costs and can provide a greater flow rate of cooling oil than the electronic oil pump when the powertrain generates serious heat due to a high rotational speed of the motor. The electronic oil pump needs to provide required cooling oil only when the motor is blocked and when the motor runs at a low rotational speed, so that required performance of the electronic oil pump can be reduced, and an electronic oil pump with a smaller size and lower costs can be selected.

In a possible implementation, the powertrain further includes a motor control unit (MCU), and the at least two oil pumps include two electronic oil pumps. The two electronic oil pumps each include an oil suction port, or the two electronic oil pumps share one oil suction port.

Oil outlet passages of the two electronic oil pumps converge and then are connected to an oil inlet port of a same heat exchanger or are respectively connected to oil inlet ports of different heat exchangers. In the latter case, the different heat exchangers respectively cool cooling oil transmitted by different electronic oil pumps, thereby improving a cooling effect. The MCU is configured to control rotational speeds of the two electronic oil pumps.

In a possible implementation, the powertrain is a multi-motor powertrain, the motor includes a first motor and a second motor, the reducer includes a first reducer and a second reducer, and the oil pan includes a reducer oil return port and a motor oil return port. The first reducer is connected to the first motor, and the second reducer is connected to the second motor. Cooling oil for cooling the first reducer and the second reducer enters the oil pan through the reducer oil return port, and cooling oil for cooling the first motor and the second motor enters the oil pan through the motor oil return port. In this case, the two motors and the two reducers share one oil pan, thereby improving integration of the powertrain.

In a possible implementation, the powertrain further includes a motor control unit (MCU), and the at least two oil pumps include a mechanical oil pump and an electronic oil pump. The mechanical oil pump and the electronic oil pump each include an oil suction port, or the mechanical oil pump and the electronic oil pump share one oil suction port. Oil outlet passages of the mechanical oil pump and the electronic oil pump converge and then are connected to an oil inlet port of a same heat exchanger, or the oil outlet passages of the mechanical oil pump and the electronic oil pump are respectively connected to oil inlet ports of different heat exchangers. The mechanical oil pump is driven by a rotating component of the powertrain, and the rotating component of the powertrain includes a rotating shaft of the first motor, a rotating shaft of the second motor, a rotating shaft of the first reducer, or a rotating shaft of the second reducer. The MCU is configured to control a rotational speed of the electronic oil pump.

In a possible implementation, the powertrain further includes a motor control unit (MCU), and the at least two oil pumps include two electronic oil pumps. The two electronic oil pumps each include an oil suction port, or the two electronic oil pumps share one oil suction port. Oil outlet passages of the two electronic oil pumps converge and then are connected to an oil inlet port of a same heat exchanger, or the two electronic oil pumps are respectively connected to oil inlet ports of different heat exchangers. The MCU is configured to control rotational speeds of the two electronic oil pumps.

In a possible implementation, the powertrain is a multi-motor powertrain, the powertrain includes a first motor, a second motor, a first reducer, and a second reducer, the oil pan includes a reducer oil return port and a motor oil return port, and the oil pan includes a first oil chamber and a second oil chamber that do not communicate with each other. The first reducer is connected to the first motor, and the second reducer is connected to the second motor. Cooling oil for cooling the first reducer enters the first oil chamber through a corresponding reducer oil return port, cooling oil for cooling the first motor enters the first oil chamber through a corresponding motor oil return port, cooling oil for cooling the second reducer enters the second oil chamber through a corresponding reducer oil return port, and cooling oil for cooling the second motor enters the second oil chamber through a corresponding motor oil return port.

In this case, the powertrain includes one oil pan. In this case, sizes of the two oil chambers may be appropriately reduced, to reduce a total space occupied by the oil pan and reduce a space occupied by the powertrain. In this implementation, the two oil chambers do not communicate with each other, to avoid that an oil pump cannot normally suck oil due to uneven distribution of cooling oil in the oil pan when the electric vehicle is in a slope or turning state.

In a possible implementation, the powertrain is a multi-motor powertrain, the powertrain includes a first motor, a second motor, a first reducer, a second reducer, and a first oil pan and a second oil pan that do not communicate with each other, the first oil pan includes a first reducer oil return port and a first motor oil return port, the second oil pan includes a second reducer oil return port and a second motor oil return port, the first oil pan includes a first oil chamber, and the second oil pan includes a second oil chamber. The first reducer is connected to the first motor, and the second reducer is connected to the second motor. Cooling oil for cooling the first reducer enters the first oil chamber through the first reducer oil return port, cooling oil for cooling the first motor enters the first oil chamber through the first motor oil return port, cooling oil for cooling the second reducer enters the second oil chamber through the second reducer oil return port, and cooling oil for cooling the second motor enters the second oil chamber through the second motor oil return port.

In this case, the powertrain includes two oil pans. In this case, a total space occupied by the two oil pans can be appropriately reduced, to reduce a space occupied by the powertrain. In this implementation, the two oil chambers do not communicate with each other, to avoid that an oil pump cannot normally suck oil due to uneven distribution of cooling oil in the oil pans when the electric vehicle is in a slope or turning state.

In a possible implementation, the powertrain further includes a motor control unit (MCU), and the at least two oil pumps include two electronic oil pumps. One of the two electronic oil pumps sucks oil from the first oil chamber, and the other electronic oil pump sucks oil from the second oil chamber. Oil outlet passages of the two electronic oil pumps converge and then are connected to an oil inlet port of a same heat exchanger or are respectively connected to oil inlet ports of different heat exchangers. The MCU is configured to control rotational speeds of the two electronic oil pumps.

In a possible implementation, the powertrain further includes a motor control unit (MCU), and the at least two oil pumps include a mechanical oil pump and an electronic oil pump. An oil suction port of the electronic oil pump is connected to the second oil chamber, and an oil outlet passage of the electronic oil pump is connected to the first oil chamber. The mechanical oil pump is driven by a rotating component of the powertrain, and the rotating component of the powertrain includes a rotating shaft of the first motor or a rotating shaft of the first reducer. An oil suction port of the mechanical oil pump is connected to the first oil chamber, or the oil suction port of the mechanical oil pump is connected to the first oil chamber and the oil outlet passage of the electronic oil pump, and an oil outlet passage of the mechanical oil pump is connected to an oil inlet port of the heat exchanger. The MCU is configured to control a rotational speed of the electronic oil pump.

In a possible implementation, the powertrain further includes a motor control unit (MCU), and the at least two oil pumps include a mechanical oil pump, a first electronic oil pump, and a second electronic oil pump. The mechanical oil pump is driven by a rotating component of the powertrain, and the rotating component of the powertrain includes a rotating shaft of the first motor or a rotating shaft of the first reducer. Oil suction ports of the mechanical oil pump and the first electronic oil pump are connected to the first oil chamber. The mechanical oil pump and the first electronic oil pump each include an oil suction port, or the mechanical oil pump and the first electronic oil pump share one oil suction port. Oil outlet passages of the mechanical oil pump and the first electronic oil pump converge and then are connected to an oil inlet port of a same heat exchanger or are respectively connected to oil inlet ports of different heat exchangers. An oil suction port of the second electronic oil pump is connected to the second oil chamber. An oil outlet passage of the second electronic oil pump is connected to the first oil chamber, or the oil outlet passage of the second electronic oil pump is connected to the first oil chamber and the oil suction port of the mechanical oil pump. The MCU is configured to control rotational speeds of the first electronic oil pump and the second electronic oil pump.

In a possible implementation, the powertrain further includes a motor control unit (MCU), and the at least two oil pumps include a mechanical oil pump, a first electronic oil pump, and a second electronic oil pump. The mechanical oil pump is driven by a rotating component of the powertrain, and the rotating component of the powertrain includes a rotating shaft of the first motor or a rotating shaft of the first reducer. An oil suction port of the mechanical oil pump is connected to the first oil chamber, and an oil outlet passage of the mechanical oil pump and an oil outlet passage of the first electronic oil pump converge and then are connected to an oil inlet port of a same heat exchanger or are respectively connected to oil inlet ports of different heat exchangers. Oil suction ports of the first electronic oil pump and the second electronic oil pump are connected to the second oil chamber, and the first electronic oil pump and the second electronic oil pump each include an oil suction port, or the first electronic oil pump and the second electronic oil pump share one oil suction port. An oil outlet passage of the second electronic oil pump is connected to the first oil chamber, or the oil outlet passage of the second electronic oil pump is connected to the first oil chamber and the oil suction port of the mechanical oil pump. The MCU is configured to control rotational speeds of the first electronic oil pump and the second electronic oil pump.

In a possible implementation, the cooling system further includes a cavity, and the oil outlet port of the heat exchanger is connected to the oil passage in the motor and the oil passage in the reducer by using the cavity. The cavity has a volume, so that pressure fluctuation in the cavity is small, making it easy to distribute a flow rate of cooling oil from the cavity. In this way, flow rates of cooling oil for cooling the two motors are basically the same, and flow rates of cooling oil for cooling the two reducers are basically the same.

In a possible implementation, the MCU is configured to: when the motor is blocked, control the electronic oil pump to operate by rotating forward at a full rotational speed; and when the electric vehicle is running, determine the rotational speed of the electronic oil pump based on a current temperature of the motor. A correspondence between the temperature of the motor and the rotational speed of the electronic oil pump is pre-calibrated.

In a possible implementation, when the motor is blocked, the MCU controls the electronic oil pump to operate by rotating forward at a full rotational speed. A motor blocking scenario usually occurs when the electric vehicle is started in a cold environment. A heated coolant flows through a power battery pack of the electric vehicle via a pipe, to heat the power battery pack, and improve discharge performance of the power battery pack.

When the electric vehicle is running and a current rotational speed of the motor is less than or equal to an inflection-point rotational speed of the motor, the MCU controls the electronic oil pump to operate by rotating forward at the full rotational speed. This is because a flow rate of cooling oil delivered by the mechanical oil pump to the powertrain is low due to a low rotational speed of the motor in this case. To meet a cooling requirement of the powertrain, in this case, the electronic oil pump operates by rotating forward at the full rotational speed.

When the current rotational speed of the motor is greater than the inflection-point rotational speed of the motor, the MCU controls the rotational speed of the electronic oil pump to gradually decrease. The inflection-point rotational speed is a rotational speed that is of the motor and that corresponds to an intersection between a relationship curve between rated output torque of the motor and a rotational speed of the motor, and a relationship curve between rated output power of the motor and the rotational speed of the motor. The inflection-point rotational speed is pre-calibrated.

In a possible implementation, the MCU is configured to: when the motor is blocked, control the electronic oil pump to operate by rotating forward at a full rotational speed; and when the electric vehicle is running, control the rotational speed of the electronic oil pump based on a current rotational speed of the motor. The rotational speed of the electronic oil pump is negatively correlated to the rotational speed of the motor, and a correspondence between the rotational speed of the electronic oil pump and the rotational speed of the motor is pre-calibrated.

As the rotational speed of the motor increases, a flow rate of cooling oil delivered by the mechanical oil pump to the powertrain increases, a flow rate of cooling oil delivered by the electronic oil pump to the powertrain gradually decreases, but an overall flow rate of cooling oil delivered by the cooling system to the powertrain increases, to meet a cooling requirement of the powertrain.

In a possible implementation, when the motor is blocked, the MCU controls the two electronic oil pumps to operate by rotating forward at a full rotational speed. When the electric vehicle is running, the MCU controls the rotational speeds of the two electronic oil pumps based on a current rotational speed of the motor. The rotational speeds of the two electronic oil pumps are positively correlated to the current rotational speed of the motor, and a correspondence between the rotational speeds of the two electronic oil pumps and the rotational speed of the motor is pre-calibrated. Alternatively, the MCU controls the rotational speeds of the two electronic oil pumps based on a current temperature of the motor. The rotational speeds of the two electronic oil pumps are positively correlated to the current temperature of the motor, and a correspondence between the rotational speeds of the two electronic oil pumps and the temperature of the motor is pre-calibrated.

In a possible implementation, the MCU controls the rotational speed of the electronic oil pump based on a current rotational speed of the motor. The rotational speed of the electronic oil pump is positively correlated to the rotational speed of the motor, and a correspondence between the rotational speed of the electronic oil pump and the rotational speed of the motor is pre-calibrated. Alternatively, the MCU controls the rotational speed of the electronic oil pump based on a current temperature of the motor. The rotational speed of the electronic oil pump is positively correlated to the current temperature of the motor, and a correspondence between the rotational speed of the electronic oil pump and the temperature of the motor is pre-calibrated.

In a possible implementation, when the motor is blocked, the MCU controls the first electronic oil pump and the second electronic oil pump to operate by rotating forward at a full rotational speed.

When the electric vehicle is running and a current rotational speed of the motor is less than or equal to an inflection-point rotational speed of the motor, the MCU controls the first electronic oil pump to operate by rotating forward at the full rotational speed. When the current rotational speed of the motor is greater than the inflection-point rotational speed of the motor, the MCU controls the rotational speed of the first electronic oil pump to gradually decrease. The inflection-point rotational speed is a rotational speed that is of the motor and that corresponds to an intersection between a relationship curve between rated output torque of the motor and a rotational speed of the motor, and a relationship curve between rated output power of the motor and the rotational speed of the motor. The inflection-point rotational speed is pre-calibrated.

When controlling the rotational speed of the second electronic oil pump, the MCU determines the rotational speed of the second electronic oil pump based on a current total oil suction flow rate of the first electronic oil pump and the mechanical oil pump. The rotational speed of the second electronic oil pump is positively correlated to the total oil suction flow rate, and a correspondence between the total oil suction flow rate and the rotational speed of the second electronic oil pump is pre-calibrated. The MCU generally controls an oil suction flow rate of the second electronic oil pump to be equal to half of the total oil suction flow rate, so as to maintain a basically same flow rate of cooling oil in the first oil chamber and the second oil chamber. Alternatively, the MCU determines the rotational speed of the second electronic oil pump with reference to a current rotational speed of the first electronic oil pump and a current rotational speed of the mechanical oil pump. A correspondence between the rotational speed of the second electronic oil pump, the rotational speed of the first electronic oil pump, and the rotational speed of the mechanical oil pump is pre-calibrated. The MCU may control the rotational speed of the second electronic oil pump to be positively correlated to a sum of the current rotational speed of the first electronic oil pump and the current rotational speed of the mechanical oil pump, to maintain a basically same flow rate of cooling oil in the first oil chamber and the second oil chamber.

In a possible implementation, when the motor is blocked, the MCU controls the first electronic oil pump and the second electronic oil pump to operate by rotating forward at a full rotational speed.

When the electric vehicle is running, the MCU controls the rotational speed of the first electronic oil pump based on a current rotational speed of the motor. The rotational speed of the first electronic oil pump is negatively correlated to the rotational speed of the motor, and a correspondence between the rotational speed of the first electronic oil pump and the rotational speed of the motor is pre-calibrated.

When controlling the rotational speed of the second electronic oil pump, the MCU determines the rotational speed of the second electronic oil pump based on a current total oil suction flow rate of the first electronic oil pump and the mechanical oil pump. The rotational speed of the second electronic oil pump is positively correlated to the total oil suction flow rate, and a correspondence between the total oil suction flow rate and the rotational speed of the second electronic oil pump is pre-calibrated. The MCU generally controls an oil suction flow rate of the second electronic oil pump to be equal to half of the total oil suction flow rate, so as to maintain a basically same flow rate of cooling oil in the first oil chamber and the second oil chamber. Alternatively, the MCU determines the rotational speed of the second electronic oil pump with reference to a current rotational speed of the first electronic oil pump and a current rotational speed of the mechanical oil pump. A relationship between the rotational speed of the second electronic oil pump, the rotational speed of the first electronic oil pump, and the rotational speed of the mechanical oil pump is pre-calibrated. The MCU may control the rotational speed of the second electronic oil pump to be positively correlated to a sum of the current rotational speed of the first electronic oil pump and the current rotational speed of the mechanical oil pump, to maintain a basically same flow rate of cooling oil in the first oil chamber and the second oil chamber.

In a possible implementation, when the motor is blocked, the MCU controls the first electronic oil pump to operate by rotating forward at a full rotational speed, and controls the second electronic oil pump to operate by rotating reversely at a full rotational speed, to transmit cooling oil in the first oil chamber to the second oil chamber, so as to maintain a basically same flow rate of cooling oil in the first oil chamber and the second oil chamber.

When the electric vehicle is running and a current rotational speed of the motor is less than or equal to an inflection-point rotational speed of the motor, the MCU controls the first electronic oil pump to operate by rotating forward at the full rotational speed. When the current rotational speed of the motor is greater than the inflection-point rotational speed of the motor, the MCU controls the rotational speed of the first electronic oil pump to gradually decrease. The inflection-point rotational speed is a rotational speed corresponding to an intersection between a relationship curve between rated output torque and a rotational speed of the motor, and a relationship curve between rated output power and the rotational speed of the motor. The inflection-point rotational speed is pre-calibrated. Alternatively, the MCU controls the rotational speed of the electronic oil pump based on a current rotational speed of the motor. The rotational speed of the electronic oil pump is negatively correlated to the rotational speed of the motor, and a correspondence between the rotational speed of the electronic oil pump and the rotational speed of the motor is pre-calibrated.

When controlling the rotational speed of the second electronic oil pump, the MCU determines the rotational speed of the second electronic oil pump based on a current oil suction flow rate difference between the first electronic oil pump and the mechanical oil pump. The rotational speed of the second electronic oil pump is positively correlated to the oil suction flow rate difference, and the correspondence between the rotational speed of the second electronic oil pump and the oil suction flow rate difference is pre-calibrated.

In a possible implementation, the MCU is configured to control the rotational speed of the second electronic oil pump so that an oil suction flow rate of the second electronic oil pump is equal to half of the oil suction flow rate difference.

In a possible implementation, a one-way valve is disposed in the electronic oil pump or in the oil outlet passage of the electronic oil pump, to restrict cooling oil in an oil passage from flowing backward and through the electronic oil pump, so as to protect the electronic oil pump.

In a possible implementation, the oil passage in the reducer is configured to spray cooling oil to the reducer. In this case, the powertrain may use a dry oil pan, so that the reducer does not need to be cooled by churning oil by a gear, which effectively reduces an oil churning loss of the gear of the reducer during rotation at a high speed and improves transmission efficiency of the reducer.

According to a second aspect, an electric vehicle may include the powertrain provided in the foregoing implementation, and further includes a power battery pack. The power battery pack is configured to supply electric energy to the powertrain. In this case, the powertrain converts the electrical energy supplied by the power battery pack into mechanical energy to drive the electric vehicle.

For the powertrain of the electric vehicle, a plurality of oil pumps may jointly provide required cooling oil, to ensure that a sufficient flow rate of cooling oil can be provided. A part of the cooling oil transmitted by the plurality of oil pumps is used to cool a motor, and another part is used to cool a reducer, so as to improve a cooling effect of a cooling system for the powertrain.

When an electronic oil pump and a mechanical oil pump jointly provide the required cooling oil for the powertrain, the mechanical oil pump is rigidly connected to a transmission component of the reducer, so that a rotational speed of the mechanical oil pump is positively correlated to a rotational speed of the motor. When the rotational speed of the motor increases, the mechanical oil pump correspondingly increases a flow rate of cooling oil delivered to the powertrain, to meet a cooling requirement of the powertrain. The mechanical oil pump has a smaller size and can provide a greater flow rate of cooling oil than the electronic oil pump when the powertrain generates serious heat due to a high rotational speed of the motor. The electronic oil pump needs to provide required cooling oil only when the motor is blocked and when the motor runs at a low rotational speed, so that required performance of the electronic oil pump can be reduced, and an electronic oil pump with a smaller size and lower costs can be selected.

In some other embodiments, a plurality of electronic oil pumps may provide the required cooling oil for the powertrain, to reduce a performance requirement on each electronic oil pump, so that a plurality of electronic oil pump with a small size and low costs may be selected.

DETAILED DESCRIPTION OF THE EMBODIMENTS

To make persons skilled in the art better understand solutions provided in the embodiments, the following first describes an application scenario of the solutions.

Figure 1:
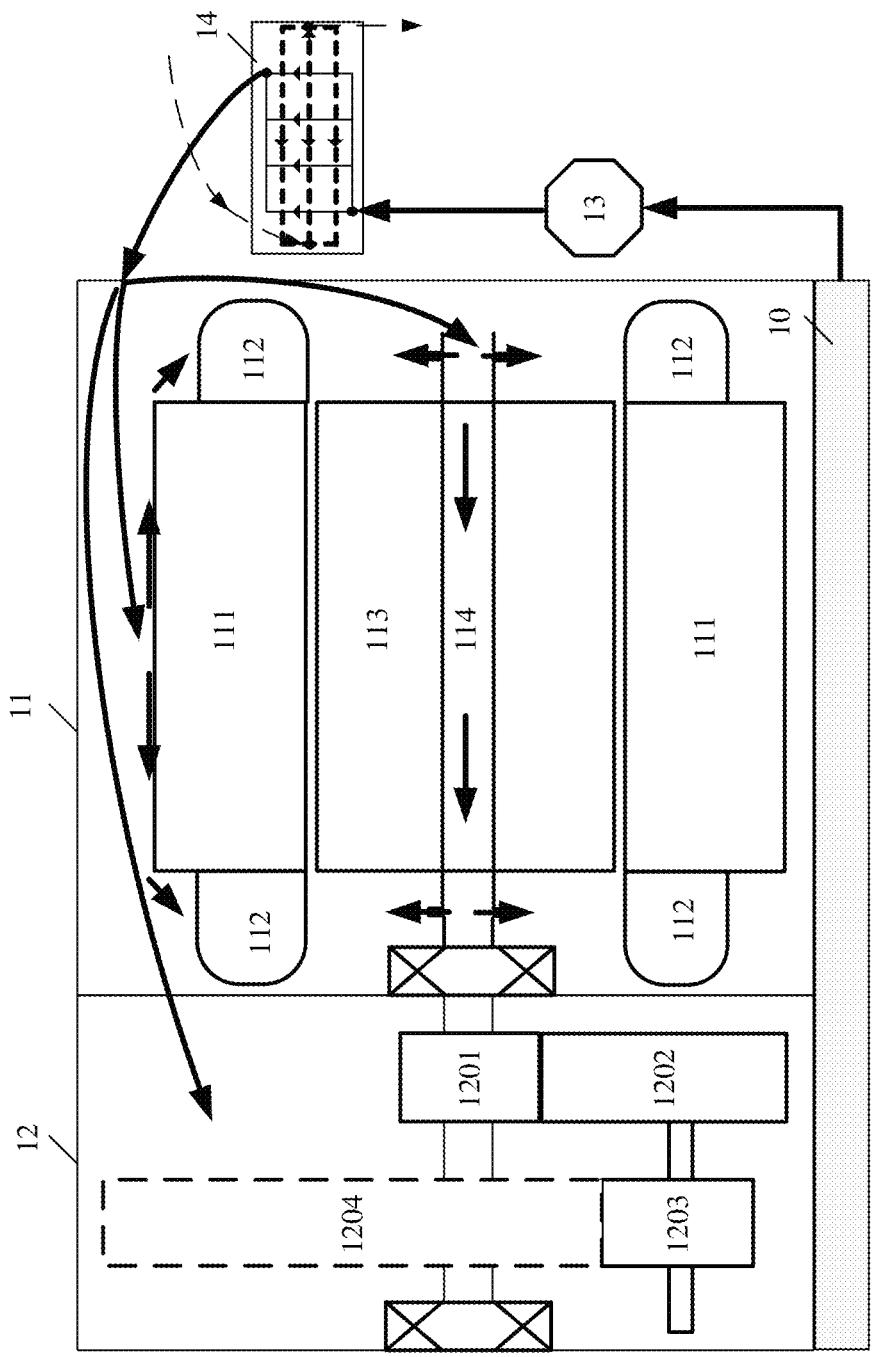
FIG. 1 is a schematic diagram of an existing powertrain and a cooling system of the powertrain.

FIG. 1 is a schematic diagram of an existing powertrain and a cooling system of the powertrain.

The powertrain is an oil-cooled powertrain and includes a motor 11, a reducer 12, and a cooling system.

The motor 11 includes a motor stator silicon steel sheet 111, an end winding 112, a magnetic steel 113, and a rotating shaft 114.

A motor stator includes the motor stator silicon steel sheet 111 and the end winding 112. A motor rotor includes the magnet steel 113 and the rotating shaft 114.

The reducer 12 includes a gear set configured to transmit power. The gear set includes an input shaft gear 1201, a first countershaft gear 1202, a second countershaft gear 1203, and an output shaft gear 1204. Each gear is fixed on a rotating shaft, and the reducer includes a plurality of rotating shafts. The figure merely shows an example implementation of the gear set, and the gear set may alternatively be implemented in another manner. This is not limited in this embodiment.

The cooling system includes an electronic oil pump 13 and a heat exchanger 14.

The electronic oil pump 13 is configured to suck cooling oil accumulated in an oil pan 10 at the bottom of the motor and drive the cooling oil to circulate between the powertrain and the heat exchanger 14. The electronic oil pump 13 drives the cooling oil to enter, through the heat exchanger 14, oil passages disposed in the motor stator and the motor rotor, and then to be in contact with components of the motor via oil outlet ports disposed in the oil passages, to cool the motor; and drives the cooling oil to enter a housing of the reducer 12, so that the gear in the reducer 12 rotates and churns the oil for cooling. When the cooling oil passes through the heat exchanger 14, heat carried in the cooling oil is transmitted by the heat exchanger 14 to a coolant circulating in the heat exchanger 14.

A cooling capacity of the oil-cooled powertrain completely depends on performance of the electronic oil pump 13 and the heat exchanger 14. As the motor 11 evolves towards a miniaturization direction, which leads to a smaller oil passage for the cooling oil to circulate in the motor 11, flow resistance of the cooling oil flowing in the oil passage is increased and a flow rate is decreased, thereby reducing a cooling effect of the cooling oil for the motor, that is, reducing a cooling effect of the cooling system for the powertrain. Therefore, the existing solution for cooling the oil-cooled powertrain restricts evolution of the powertrain toward a direction of miniaturization and high power density.

A plurality of oil pumps may jointly provide required cooling oil for the powertrain, to ensure that a sufficient flow rate of cooling oil can be provided. A part of the cooling oil transmitted by the plurality of oil pumps is used to cool a motor, and another part is used to cool a reducer, to ensure good heat dissipation of the powertrain, and improve a cooling effect of a cooling system for the powertrain.

To make a person skilled in the art understand the solutions better, the following describes the embodiments with reference to the accompanying drawings.

The terms such as "first", "second", and "third" in the description are merely used for a descriptive purpose and cannot be interpreted as indicating or implying relative importance or implying a quantity of indicated features.

In addition, orientation terms such as "upper" and "lower" may be defined by, but are not limited to, orientations of components schematically placed in the accompanying drawings. It should be understood that these orientation terms may be relative concepts and are used for description and clarification of "relative", which may change correspondingly according to a change in a placement orientation of a component drawing in the drawings.

Unless otherwise expressly specified and limited, the term "connected" should be understood in a broad sense. For example, "connected" may be fixed connection, or may be detachable connection or be integrated, which may be directly connected or indirectly connected by using an intermediate medium.

In the following description, for ease of description, an "oil passage" is used in place of a "pipe" in a physical structure or a container capable of carrying cooling oil; and in a corresponding reference drawing, the "oil passage" is denoted by an arrowed line, and in a corresponding actual application, the arrowed line represents a corresponding "pipe" or a container capable of carrying cooling oil.

An embodiment provides a powertrain, which is described below with reference to accompanying drawings.

Figure 2:
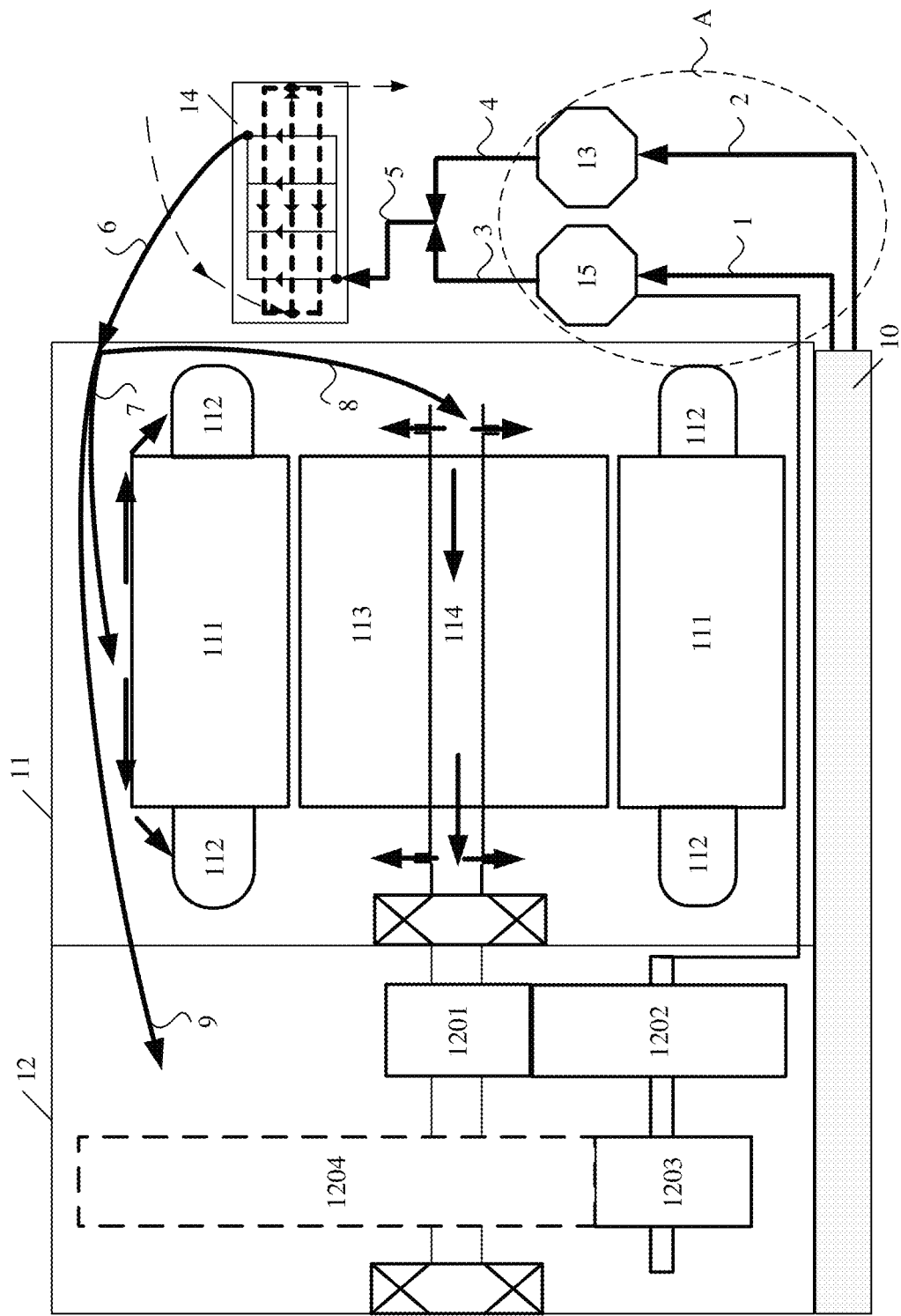
FIG. 2 is a schematic diagram of a cooling system of a powertrain according to an embodiment.

FIG. 2 is a schematic diagram of a powertrain according to an embodiment.

The powertrain shown in the figure includes an oil pan 10, a motor 11, a reducer 12, and a cooling system. The cooling system includes a heat exchanger 14 and at least two oil pumps. The figure shows an implementation in which the at least two oil pumps include an electronic oil pump 13 and a mechanical oil pump 15.

The at least two oil pumps deliver, to the heat exchanger 14, cooling oil sucked from the oil pan 10. The heat exchanger 14 is configured to cool the cooling oil sucked by the at least two oil pumps.

An oil outlet port of the heat exchanger 14 is connected to an oil passage in the motor 11 and an oil passage in the reducer 12, so that a part of the cooling oil cools the motor 11 through the oil passage in the motor 11, and another part of the cooling oil cools the reducer 12 through the oil passage in the reducer 12.

According to the solution in this embodiment, the plurality of oil pumps jointly provides required cooling oil for the powertrain, to ensure that a sufficient flow rate of cooling oil can be provided. A part of the cooling oil transmitted by the plurality of oil pumps is used to cool the motor, and another part is used to cool the reducer, to ensure good heat dissipation of the powertrain, and improve a cooling effect of the cooling system for the powertrain.

The following describes in detail different implementations of the powertrain.

The following first describes an implementation when the powertrain is a single-motor powertrain.

Still refer to the powertrain shown in FIG. 2.

The powertrain includes a cooling system, a motor 11, and a reducer 12. The cooling system includes an electronic oil pump 13, a mechanical oil pump 15, and a heat exchanger 14.

The mechanical oil pump 15 is rigidly connected to a rotating component of the powertrain, so as to be driven by the motor 11 or the reducer 12.

In the implementation shown in the figure, the mechanical oil pump 15 is rigidly connected to any rotating shaft of the reducer 12 and driven by the rotating shaft of the reducer 12. In some other embodiments, the mechanical oil pump 15 may alternatively be rigidly connected to an input shaft of the reducer and driven by the input shaft of the reducer 12. In still some other embodiments, the mechanical oil pump 15 may alternatively be rigidly connected to a rotating shaft 114 of the motor 11 and driven by the rotating shaft 114.

The motor 11 and the reducer 12 share an oil pan 10 at the bottom. The oil pan 10 includes a reducer oil return port and a motor oil return port. Cooling oil for cooling the reducer 12 enters the oil pan 10 through the reducer oil return port, and cooling oil for cooling the motor 11 enters the oil pan 10 through the motor oil return port.

In the implementation shown in the figure, the mechanical oil pump 15 and the electronic oil pump 13 each include an oil suction port, to suck oil through different oil suction ports. In this case, an oil passage from which the mechanical oil pump 15 sucks oil is an oil passage 1, and an oil passage from which the electronic oil pump 13 sucks oil is an oil passage 2.

Figure 3:
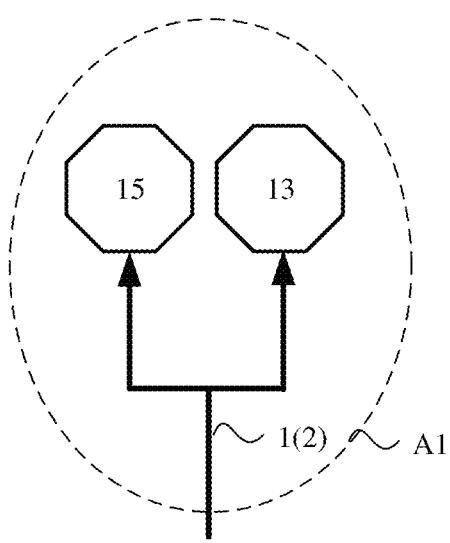
FIG. 3 is a schematic diagram 1 of an oil passage according to an embodiment.

In another possible implementation, refer to a schematic diagram 1 of an oil passage shown in FIG. 3. An area A1 in FIG. 3 corresponds to an area A in FIG. 2. In this case, the mechanical oil pump 15 and the electronic oil pump 13 share one oil suction port.

An oil passage 3 and an oil passage 4 that are shown in FIG. 2 converge into an oil passage 5 and then are connected to an oil inlet port of the heat exchanger 14, and an oil outlet port of the heat exchanger 14 is connected to an oil passage 7, an oil passage 8, and an oil passage 9 by using an oil passage 6.

When the cooling oil passes through the heat exchanger 14, heat carried in the cooling oil is transmitted by the heat exchanger 14 to a coolant circulating in the heat exchanger 14.

Figure 4:
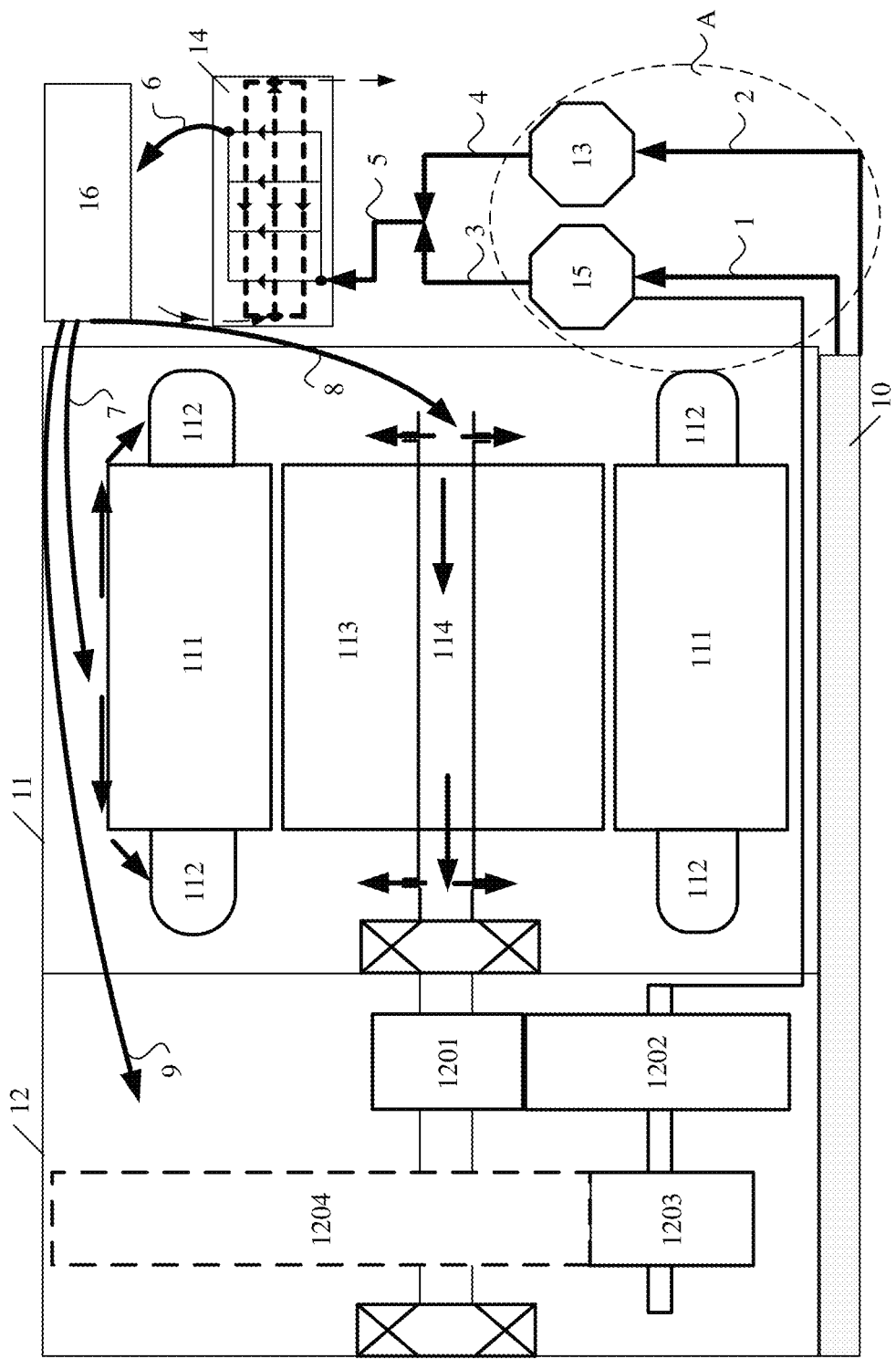
FIG. 4 is a schematic diagram of another powertrain according to an embodiment.

In some other embodiments, refer to a schematic diagram of a powertrain shown in FIG. 4. The heat exchanger 14 is connected to a cavity 16 by using the oil passage 6, and the cavity 16 is connected to the oil passage 7, the oil passage 8, and the oil passage 9.

The cavity 16 has a volume, so that pressure fluctuation in the cavity 16 is small, making it easy to distribute a flow rate of cooling oil from the cavity. A shape of the cavity 16 is not limited in this embodiment. In an actual application, the shape of the cavity 16 is adapted to each oil passage and a percentage of a flow rate of cooling oil in the oil passage.

An outer ring of a motor stator is provided with a cooling oil passage. Cooling oil in the oil passage 7 is used to cool the motor stator, that is, cool a motor stator silicon steel sheet 111 and an end winding 112.

Cooling oil in the oil passage 8 is used to cool a motor rotor, that is, cool a magnet steel 113 and the rotating shaft 114. In a possible implementation, the motor rotor is cooled by splashing oil.

Cooling oil in the oil passage 9 is used to cool the reducer 12. The reducer 12 is cooled by spraying oil. When an oil pan of the reducer 12 is a dry oil pan, the oil passage 9 actively sprays cooling oil to the reducer 12, to provide cooling oil required by the reducer 12. In this case, in some embodiments, the reducer may use a dry oil pan, that is, cooling does not need to be performed by churning oil by a gear, which effectively reduces an oil churning loss of the gear of the reducer 12 during rotation at a high speed and improves transmission efficiency of the reducer.

The oil pan 10 is provided with a reducer oil return port and a motor oil return port. Cooling oil for cooling the reducer enters the oil pan 10 through the reducer oil return port, and cooling oil for cooling the motor enters the oil pan 10 through the motor oil return port.

To protect the electronic oil pump 13, a one-way valve is disposed in the electronic oil pump 13, so that cooling oil can flow only from the oil passage 2 to the oil passage 4, to prevent high-pressure cooling oil in the oil passage 3 from being diverted to the oil passage 4 and damaging the electronic oil pump 13 when the mechanical oil pump 15 has a large oil suction flow rate due to a high rotational speed of the motor 11. In some other embodiments, the one-way valve may alternatively be disposed in an oil outlet passage, that is, the oil passage 4 of the electronic oil pump 13.

The following describes operating manners of the electronic oil pump 13 and the mechanical oil pump 15.

Figure 5:
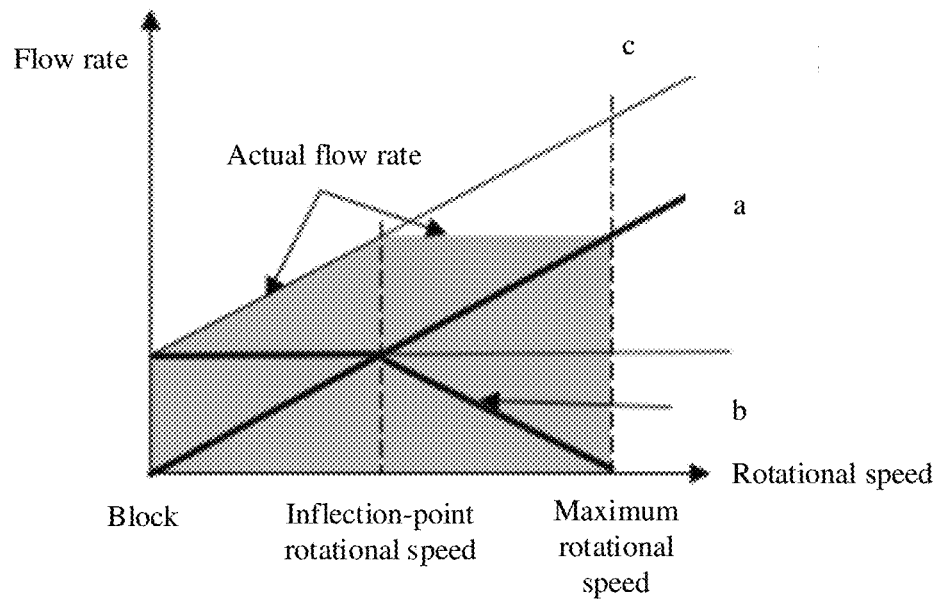
FIG. 5 is a diagram 1 of a relationship between a flow rate of cooling oil transmitted by an oil pump and a rotational speed of a motor according to an embodiment.

FIG. 5 is a diagram 1 of a relationship between a flow rate of cooling oil transmitted by an oil pump and a rotational speed of a motor according to an embodiment.

As shown in the figure, a line a represents a relationship between a flow rate of cooling oil transmitted by the mechanical oil pump 15 and the rotational speed of the motor, and a line b represents a relationship between a flow rate of cooling oil transmitted by the electronic oil pump 13 and the rotational speed of the motor.

When the motor is blocked, an electric vehicle is stationary and the rotational speed of the motor is zero. In this case, the rotating shaft of the reducer 12 does not rotate, and the mechanical oil pump 15 does not suck oil. The electronic oil pump 13 is started, and the oil passages 2, 4, 5, 6, 7, 8, and 9 are turned on. Cooling oil transmitted by the electronic oil pump 13 takes away heat generated by the blocked motor, and the coolant flowing through the heat exchanger 14 absorbs heat of the cooling oil and is heated.

In some embodiments, a motor blocking scenario usually occurs when the electric vehicle is started in a cold environment. The heated coolant flows through a power battery pack of the electric vehicle via a pipe, to heat the power battery pack, and improve discharge performance of the power battery pack.

When the electric vehicle is running, the rotational speed of the motor is not zero. In this case, a flow rate of cooling oil delivered by the mechanical oil pump 15 to the powertrain is positively correlated to a rotational speed of the rotating shaft, that is, the rotational speed of the motor 11. Therefore, when the rotational speed of the motor 11 increases, which increases heat generated by the powertrain, the mechanical oil pump 15 correspondingly increases the flow rate of cooling oil delivered to the powertrain, to meet a cooling requirement of the powertrain.

In the figure, an inflection-point rotational speed is a rotational speed that is of the motor and that corresponds to an intersection between a relationship curve between rated output torque of the motor and the rotational speed of the motor, and a relationship curve between rated output power of the motor and the rotational speed of the motor. The inflection-point rotational speed is pre-calibrated.

When the rotational speed of the motor is less than or equal to the inflection-point rotational speed, the flow rate of cooling oil delivered by the mechanical oil pump 15 to the powertrain is low due to the low rotational speed of the motor. To meet a cooling requirement of the powertrain, the electronic oil pump 13 may operate by rotating forward at a full rotational speed. After the rotational speed of the motor is greater than the inflection-point rotational speed, the electronic oil pump 13 gradually decreases the rotational speed.

The electronic oil pump 13 is controlled by a motor control unit (MCU). The MCU in this embodiment may be an application-specific integrated circuit (ASIC), a programmable logic device (PLD), a digital signal processor (DSP), or a combination thereof. The PLD may be a complex programmable logic device (CPLD), a field-programmable gate array (FPGA), a general array logic (GAL), or any combination thereof. This is not limited in this embodiment.

In some embodiments, a vehicle control unit (VCU) generates corresponding rotational speed information based on a current rotational speed of the motor 11 of the electric vehicle, and the VCU sends the rotational speed information to the MCU, so that the MCU controls an operating status of the electronic oil pump 13. In addition, in another possible implementation, the MCU may measure the rotational speed of the motor 11 itself.

In some other embodiments, the MCU monitors a temperature of the motor 11 in real time and controls the operating status of the electronic oil pump 13 based on the temperature of the motor 11. A correspondence between the temperature of the motor 11 and the rotational speed of the electronic oil pump 13 may be pre-calibrated and stored. In a possible implementation, the correspondence between the temperature of the motor 11 and the rotational speed of the electronic oil pump 13 is stored in a form of a data table. In another possible implementation, a function relationship between the temperature of the motor 11 and the rotational speed of the electronic oil pump 13 is stored, to facilitate real-time calculation.

According to the solution, the mechanical oil pump 15 is used as a main oil pump to provide cooling oil required by the powertrain, and the electronic oil pump 13 is used as an auxiliary oil pump. When the rotational speed of the motor is greater than a preset rotational speed, the MCU may control the electronic oil pump 13 to gradually decrease the rotational speed, so that power consumption of the electronic oil pump 13 can be reduced. In this case, an actual flow rate of cooling oil delivered by the cooling system to the powertrain corresponds to a boundary of a gray area indicated by an arrow in the figure.

If the electronic oil pump 13 keeps operating by rotating forward at the full rotational speed, a maximum value of a theoretical flow rate of cooling oil delivered by the cooling system to the powertrain corresponds to a line c in the figure.

In some embodiments, when detecting that the temperature of the motor 11 is excessively high, for example, when the temperature exceeds a preset temperature value, the MCU may also control the electronic oil pump 13 to operate by rotating forward at the full rotational speed. In this case, the cooling system delivers cooling oil to the powertrain based on the line c, to provide a maximum flow rate of cooling oil to the powertrain.

The preset rotational speed in the foregoing description is not limited in this embodiment. In some embodiments, the preset rotational speed is pre-calibrated and stored.

The following describes another operating manner of the electronic oil pump 13.

Figure 6:
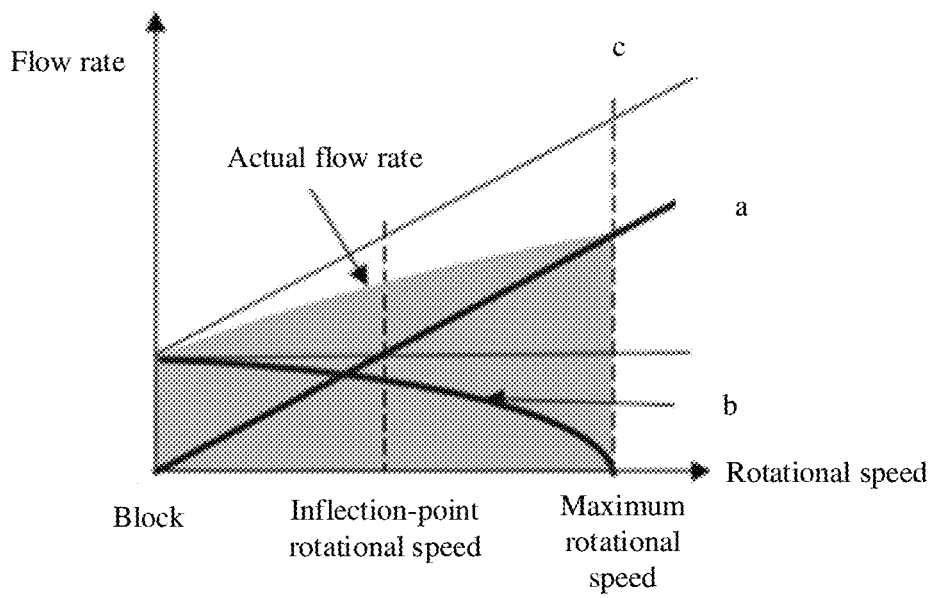
FIG. 6 is a diagram 2 of a relationship between a flow rate of cooling oil transmitted by an oil pump and a rotational speed of a motor according to an embodiment.

FIG. 6 is a diagram 2 of a relationship between a flow rate of cooling oil transmitted by an oil pump and a rotational speed of a motor according to an embodiment.

As shown in the figure, an operating principle of the mechanical oil pump 15 is the same as that described above, and a difference lies in that the rotational speed of the electronic oil pump 13 is negatively correlated to the rotational speed of the motor 11 except for a blocked condition. In this case, as the rotational speed of the motor 11 increases, the flow rate of cooling oil delivered by the mechanical oil pump 15 to the powertrain rapidly increases, the flow rate of cooling oil delivered by the electronic oil pump 13 to the powertrain gradually decreases, but an overall flow rate of cooling oil delivered by the cooling system to the powertrain increases, to meet a cooling requirement of the powertrain.

The foregoing description is provided by using an example in which the cooling system includes one mechanical oil pump and one electronic oil pump. In some other embodiments, the cooling system may alternatively include one mechanical oil pump and at least two electronic oil pumps, and each electronic oil pump is controlled by the MCU. For an operating manner of each electronic oil pump, refer to the operating manners of the electronic oil pump 13. Details are not described herein again in this embodiment.

In conclusion, when this embodiment is applied to a single-motor powertrain, the electronic oil pump and the mechanical oil pump jointly provide required cooling oil for the powertrain, to improve a cooling effect of the cooling system for the powertrain. The mechanical oil pump is a main oil pump, and the electronic oil pump is an auxiliary oil pump. The mechanical oil pump is rigidly connected to a transmission component of the reducer, so that the rotational speed of the mechanical oil pump is positively correlated to the rotational speed of the motor. When the rotational speed of the motor increases, the mechanical oil pump correspondingly increases the flow rate of cooling oil delivered to the powertrain, to meet a cooling requirement of the powertrain. The mechanical oil pump has a smaller size and can provide a greater flow rate of cooling oil than the electronic oil pump when the powertrain generates serious heat due to a high rotational speed of the motor. The electronic oil pump needs to provide required cooling oil only when the motor is blocked and when the motor runs at a low rotational speed, so that required performance of the electronic oil pump can be reduced, and an electronic oil pump with a smaller size and lower costs can be selected. The cavity can be adapted to each oil passage and the percentage of the flow rate of cooling oil in the oil passage. In addition, when the oil pan of the reducer is a dry oil pan, cooling oil required by the reducer is provided by actively spraying cooling oil to the reducer, so that the reducer does not need to be cooled by churning oil by a gear, which effectively reduces an oil churning loss of the gear of the reducer during rotation at a high speed, and improves transmission efficiency of the reducer.

In some other embodiments, when the powertrain is applied to a single-motor powertrain, only two or more electronic oil pumps may be provided. In this case, each electronic oil pump is controlled by the MCU. In some embodiments, a rotational speed of each electronic oil pump is positively correlated to the rotational speed of the motor. When the rotational speed of the motor increases, each electronic oil pump correspondingly increases a flow rate of cooling oil delivered to the powertrain, to meet a cooling requirement of the powertrain. The MCU may obtain the rotational speed information of the motor by using the VCU or measure the rotational speed of the motor itself. In some other embodiments, the rotational speed of each electronic oil pump is positively correlated to the temperature of the motor, and the MCU controls the rotational speed of each electronic oil pump based on a temperature of the motor detected in real time. A correspondence between the temperature of the motor and the rotational speed of the electronic oil pump may be pre-calibrated.

The powertrain described above may alternatively be provided with a plurality of heat exchangers, and each heat exchanger is configured to cool cooling oil transmitted by one oil pump. Details are not described herein.

The following describes an implementation of a multi-motor powertrain. The following description is provided by using an example in which a quantity of motors is 2. An implementation in which the quantity of motors is greater than 2 is similar thereto, and details are not described again in this embodiment.

Figure 7A:
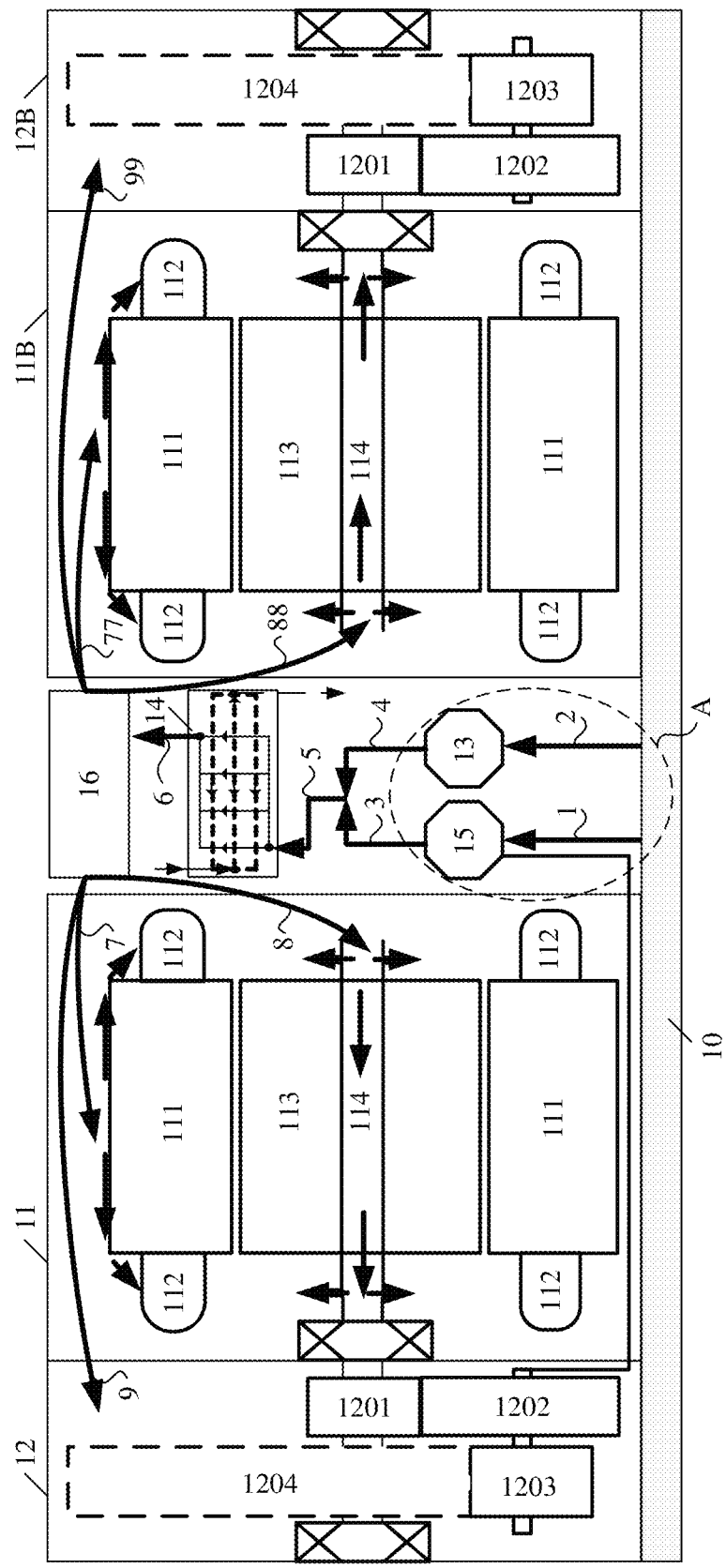
FIG. 7A is a schematic diagram of still another powertrain according to an embodiment.

FIG. 7A is a schematic diagram of still another powertrain according to an embodiment.

The powertrain shown in the figure includes a first motor 11, a second motor 11B, a first reducer 12, a second reducer 12B, and a cooling system.

The first motor 11 and the second motor 11B have a same implementation and operating principle, and the first reducer 12 and the second reducer 12B have a same implementation and operating principle.

The cooling system includes an electronic oil pump 13, a mechanical oil pump 15, a heat exchanger 14, and a cavity 16.

The mechanical oil pump 15 is rigidly connected to a rotating component of the powertrain, so as to be driven by the first motor 11 or the first reducer 12.

In the implementation shown in the figure, the mechanical oil pump 15 is rigidly connected to a rotating shaft of the first reducer 12 and driven by the rotating shaft of the first reducer 12. It may be understood that in some other embodiments, the mechanical oil pump 15 may alternatively be rigidly connected to a rotating shaft of the second reducer 12B and driven by the rotating shaft of the second reducer 12B.

The first motor 11, the second motor 11B, the first reducer 12, and the second reducer 12B share an oil pan 10 at the bottom. The oil pan 10 includes a reducer oil return port and a motor oil return port. Cooling oil for cooling the first reducer 12 and the second reducer 12B enters the oil pan 10 through the reducer oil return port, and cooling oil for cooling the first motor 11 and the second motor 11B enters the oil pan 10 through the motor oil return port. A plurality of reducer oil return ports and a plurality of motor oil return ports may be disposed, which are distributed at different positions.

In the implementation shown in the figure, the mechanical oil pump 15 and the electronic oil pump 13 respectively suck oil through different oil suction ports. In this case, an oil passage from which the mechanical oil pump 15 sucks oil is an oil passage 1, and an oil passage from which the electronic oil pump 13 sucks oil is an oil passage 2.

In another possible implementation, refer to a schematic diagram 1 of an oil suction passage shown in FIG. 3. An area A1 in FIG. 3 corresponds to an area A in FIG. 7A. In this case, the mechanical oil pump 15 and the electronic oil pump 13 share one oil suction port.

An oil passage 3 and an oil passage 4 that are shown in FIG. 7A converge into an oil passage 5 and then are connected to the heat exchanger 14, and the heat exchanger 14 is connected to the cavity 16 by using an oil passage 6.

The cavity 16 has a volume, so that pressure fluctuation in the cavity 16 is small, making it easy to distribute a flow rate of cooling oil from the cavity. The cavity 16 is connected to an oil passage 7, an oil passage 77, an oil passage 8, an oil passage 88, an oil passage 9, and an oil passage 99. When the cooling oil is distributed through the cavity, flow rates of cooling oil of the oil passage 7 and the oil passage 77 are basically the same, flow rates of cooling oil of the oil passage 8 and the oil passage 88 are basically the same, and flow rates of cooling oil of the oil passage 9 and the oil passage 99 are basically the same.

Outer rings of motor stators are provided with cooling oil passages. Cooling oil in the oil passage 7 and the oil passage 77 is used to cool the motor stators of the two motors, that is, cool motor stator silicon steel sheets 111 and end windings 112.

Cooling oil in the oil passage 8 and the oil passage 88 is used to cool motor rotors of the two motors, that is, cool magnet steels 113 and rotating shafts 114. In a possible implementation, the motor rotors of the two motors are cooled by splashing oil.

Cooling oil in the oil passage 9 and the oil passage 99 is used to cool the first reducer 12 and the second reducer 12B by spraying oil. In this case, in some embodiments, dry oil pans may be used, that is, the reducers do not need to be cooled by churning oil by gears, which effectively reduces oil churning losses of the gears of the reducers during rotation at a high speed and improves transmission efficiency of the reducers.

A one-way valve is disposed in the electronic oil pump 13, so that cooling oil can flow only from the oil passage 2 to the oil passage 4, to prevent high-pressure cooling oil in the oil passage 3 from being diverted to the oil passage 4 and damaging the electronic oil pump 13 when the mechanical oil pump 15 has a large oil suction flow rate due to a high rotational speed of the first motor 11.

For operating manners of the electronic oil pump 13 and the mechanical oil pump 15, refer to related descriptions corresponding to FIG. 5 and FIG. 6. Details are not described herein again in this embodiment.

Figure 7B:
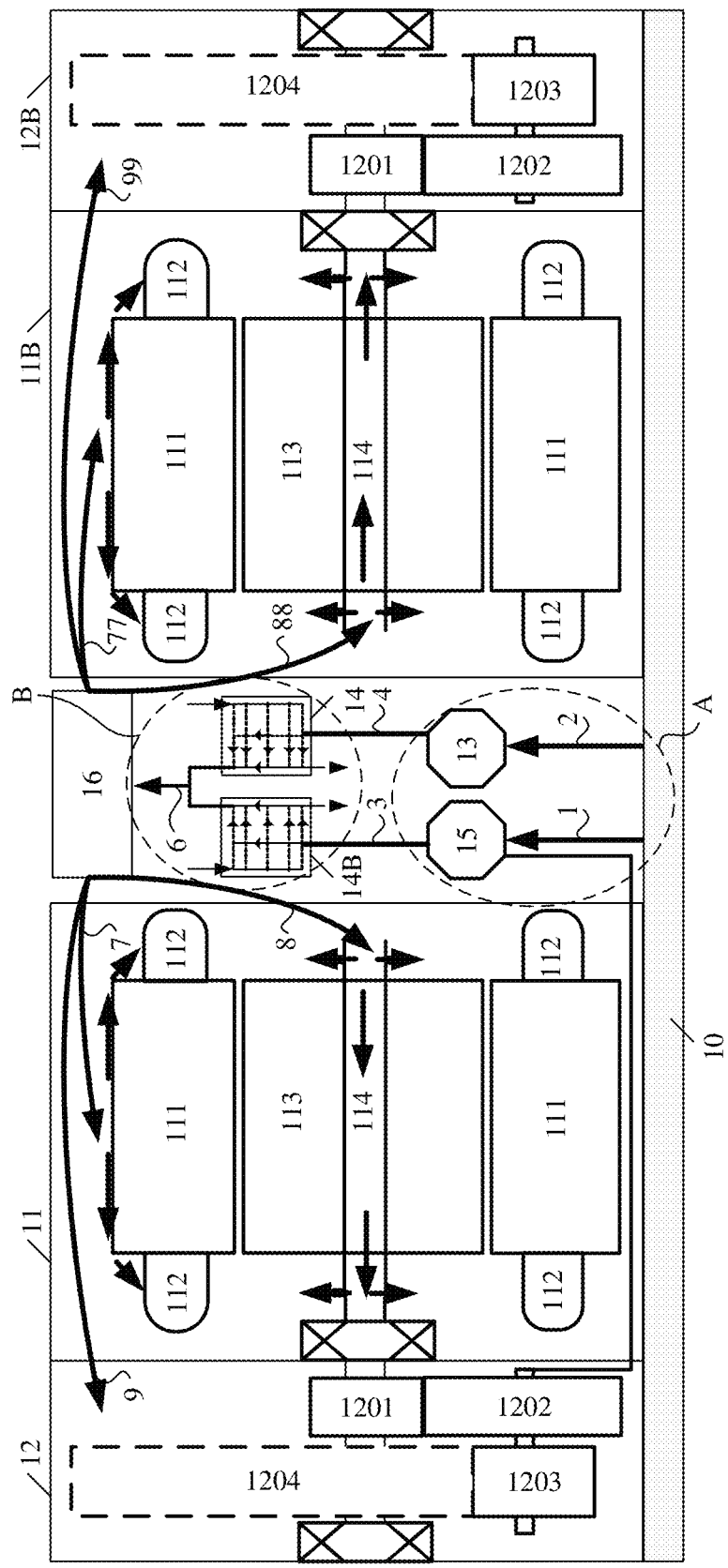
FIG. 7B is a schematic diagram of yet another powertrain according to an embodiment.

FIG. 7B is a schematic diagram of yet another powertrain according to an embodiment.

The powertrain shown in FIG. 7B differs from that shown in FIG. 7A in including two heat exchangers. The electronic oil pump transmits cooling oil to a first heat exchanger 14 through the oil passage 4, and the mechanical oil pump 15 transmits cooling oil to a second heat exchanger 14B through the oil passage 3. Oil outlet ports of the first heat exchanger 14 and the second heat exchanger 14B converge and are connected to the cavity 16 by using the oil passage 6. The two heat exchangers respectively cool the cooling oil delivered by the two oil pumps, thereby improving a cooling effect of the cooling oil.

Figure 7C:
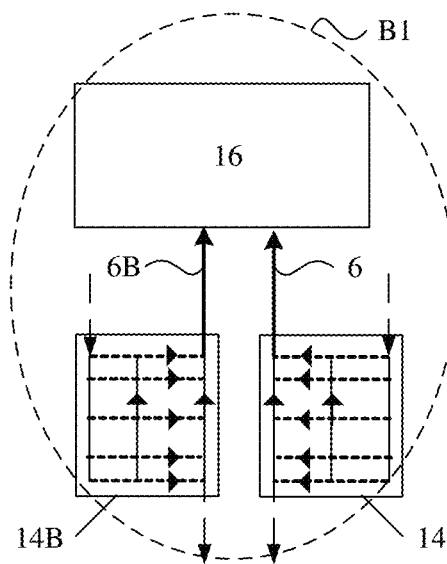
FIG. 7C is a schematic diagram 2 of an oil passage according to an embodiment.

In this case, an area B in FIG. 7B may alternatively be implemented in a manner of an area B1 shown in FIG. 7C, that is, the first heat exchanger 14 is connected to the cavity 16 by using an oil passage 6, and the second heat exchanger 14B is connected to the cavity 16 by using an oil passage 6B. In this case, oil outlet passages of the two heat exchangers do not directly converge, to prevent cooling oil of the second heat exchanger 14B from flowing into the first heat exchanger 14B due to high oil pressure at the oil outlet port caused by a high rotational speed of the motor 11.

The following provides a description with reference to a structure of the powertrain by using FIG. 7A as an example.

Figure 8:
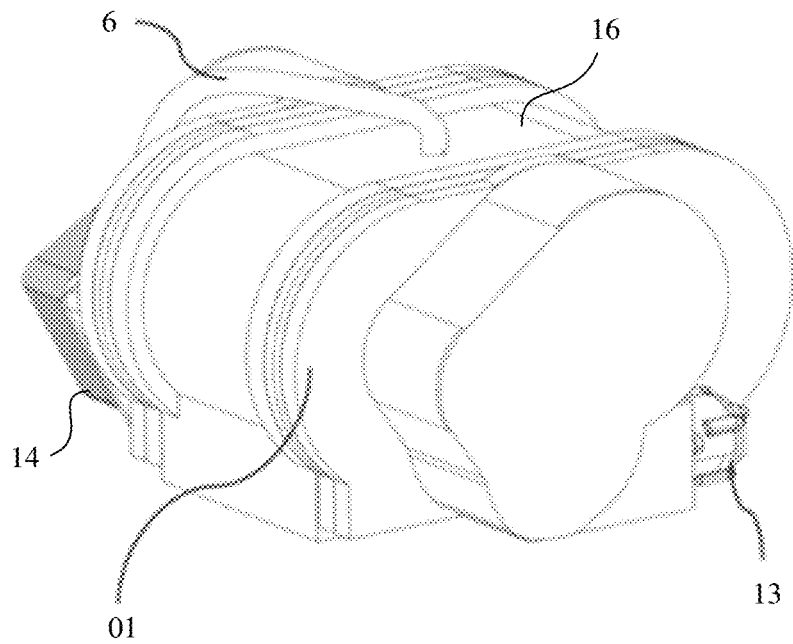
FIG. 8 is a schematic diagram of appearance of a powertrain according to an embodiment.

FIG. 8 is a schematic diagram of appearance of a powertrain according to an embodiment.

A housing 01 of the powertrain shown in the figure is configured to accommodate the motors, the reducers, and the mechanical oil pump. The electronic oil pump 13 is partially inside the housing 01 and partially outside the housing 01. The heat exchanger 14 is disposed outside the housing 01, and an oil outlet port of the heat exchanger 14 is connected to the cavity 16 of the powertrain by using the oil passage 6.

Figure 9:
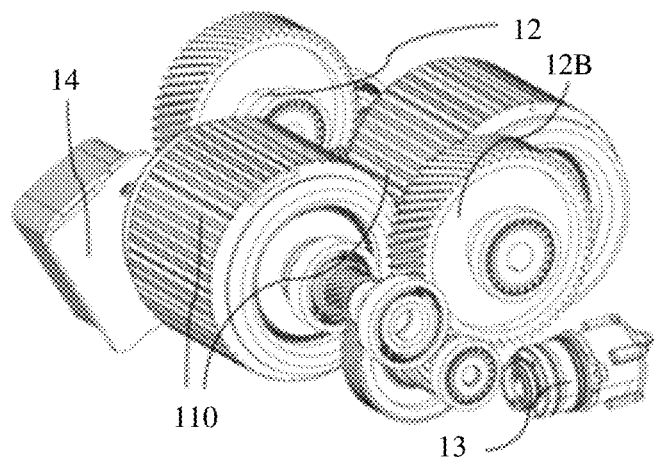
FIG. 9 is a schematic diagram of an internal structure of a powertrain according to an embodiment.

FIG. 9 is a schematic diagram of an internal structure of a powertrain according to an embodiment.

The two motors of the powertrain are placed side by side, and each motor drives one reducer. The outer rings of the motor stators 110 of the two motors are provided with cooling oil passages. The cooling oil passages are respectively connected to the oil passage 7 and the oil passage 77 that are shown in FIG. 7A.

Figure 10:
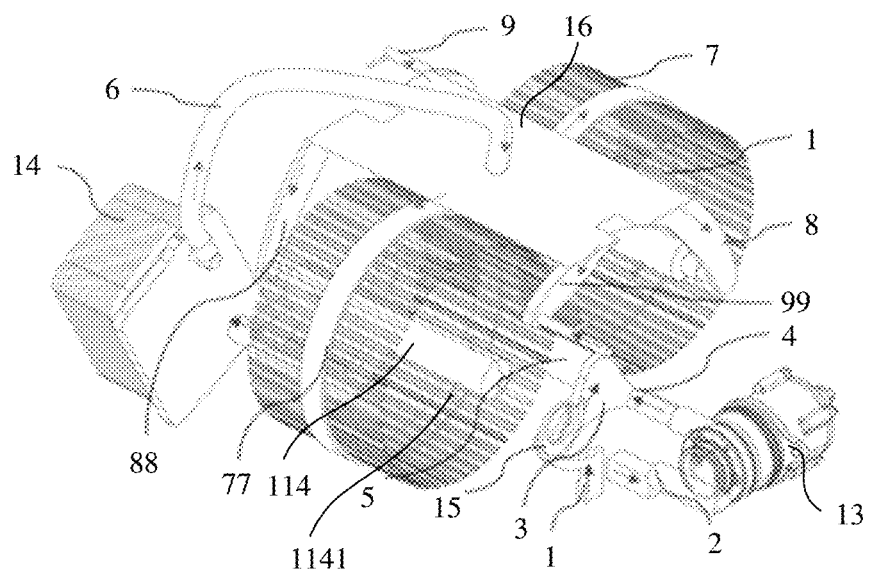
FIG. 10 is a schematic diagram 1 of an oil passage in a powertrain according to an embodiment.

FIG. 10 is a schematic diagram 1 of an oil passage in a powertrain according to an embodiment.

The mechanical oil pump 15 and the electronic oil pump 13 are arranged on a same side, and the heat exchanger 14 is located on a different side. The mechanical oil pump 15 sucks oil through the oil passage 1 and delivers the oil through the oil passage 3. The electronic oil pump sucks oil through the oil passage 2 and delivers the oil through the oil passage 4. The oil passages 2 and 4 converge and then are connected to the heat exchanger 14 by using an axial oil passage 5, and the oil outlet port of the heat exchanger 14 is connected to the cavity 16 by using the oil passage 6. The cavity 16 is connected to the oil passage 7, the oil passage 77, the oil passage 8, the oil passage 88, the oil passage 9, and the oil passage 99.

Cooling oil in the oil passage 7 and the oil passage 77 is used to cool the motor stators of the two motors.

Cooling oil in the oil passage 8 and the oil passage 88 is used to cool the motor rotors of the two motors. The oil passage 8 and the oil passage 88 that are shown in the figure are connected to oil passages inside the rotating shafts 114. A plurality of rotating shaft oil outlet ports 1141 are further disposed on the rotating shafts 114. When the rotating shafts rotate, cooling oil is splashed out from the rotating shaft oil outlet ports 1141 to cool the motor rotors.

The oil passage 9 sprays cooling oil through an oil outlet port to cool the first reducer 12. The oil passage 99 sprays cooling oil through an oil outlet port to cool the second reducer 12B. In the powertrain in this embodiment, the reducers are cooled by spraying cooling oil instead of churning oil by gears, so that on one hand, the cooling oil can be in fuller contact with the reducers, and on the other hand, oil churning losses of the gears of the reducers are reduced.

Figure 11:
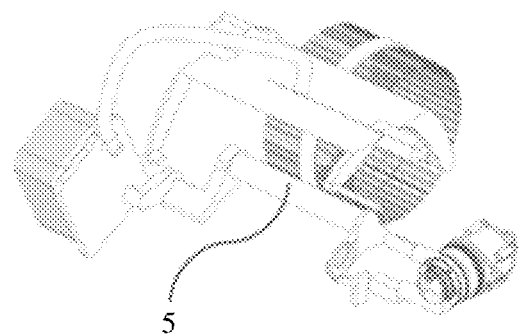
FIG. 11 is a schematic diagram 2 of an oil passage in a powertrain according to an embodiment.

FIG. 11 is a schematic diagram 2 of an oil passage in a powertrain according to an embodiment.

In FIG. 11, oil passages corresponding to one motor are hidden, to more clearly show that the oil passages 2 and 4 converge and then are connected to the heat exchanger 14 by using the axial oil passage 5.

Figure 12:
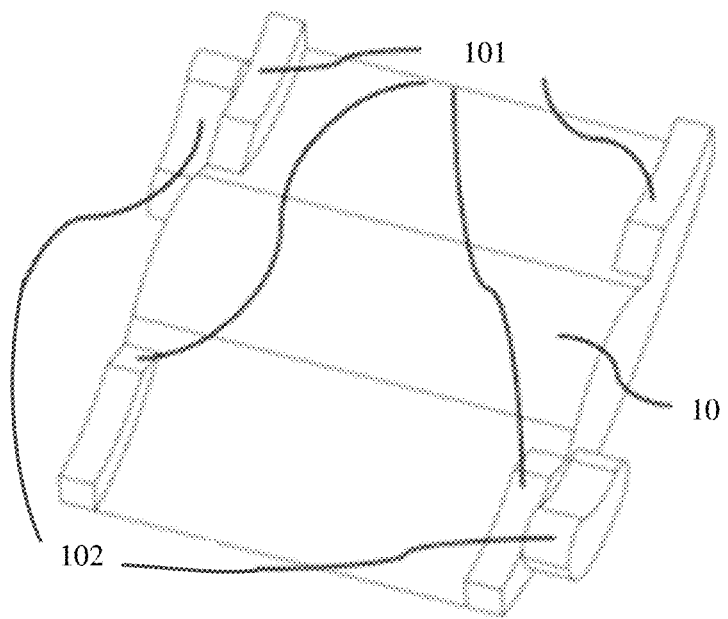
FIG. 12 is a schematic diagram of an oil pan of a powertrain according to an embodiment.

FIG. 12 is a schematic diagram of an oil pan of a powertrain according to an embodiment.

The oil pan has a motor oil return port 101 corresponding to each of bottom positions at two ends of each motor, and a reducer oil return port 102 corresponding to a bottom position of each reducer. Each motor oil return port 101 and each reducer oil return port 102 are connected to the oil pan 10 located at the bottom of the motor.

When the powertrain operates, cooling oil for cooling the motor enters the oil pan 10 through the motor oil return port 101, and cooling oil for cooling the reducer enters the oil pan 10 through the reducer oil return port 102.

The oil passage 1 and the oil passage 2 are connected to the oil pan 10, so that the electronic oil pump 13 sucks oil through the oil passage 1, and the mechanical oil pump 15 sucks oil through the oil passage 2.

Figure 13:
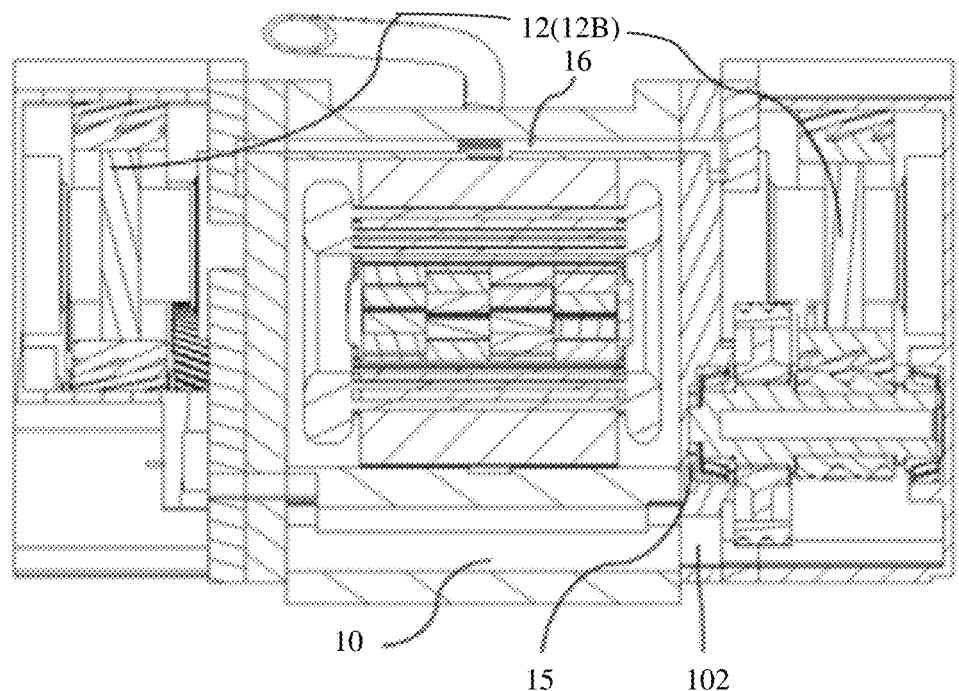
FIG. 13 is a schematic cross-sectional view 1 of a powertrain according to an embodiment.
Figure 14:
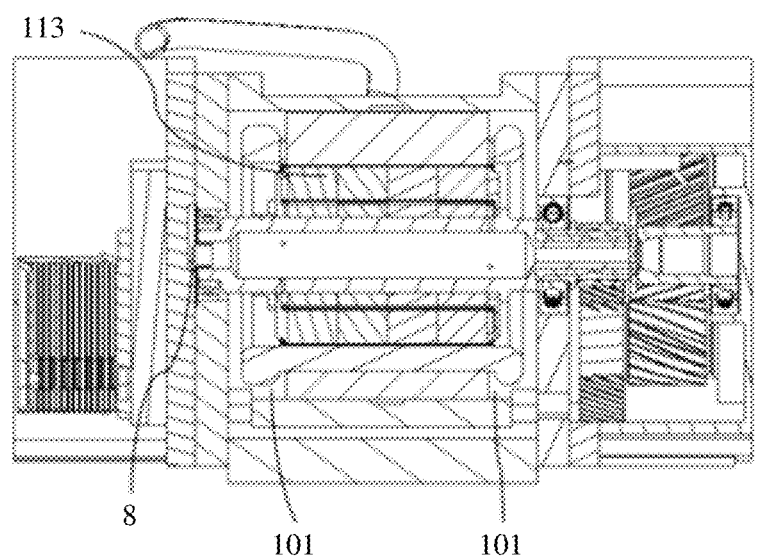
FIG. 14 is a schematic cross-sectional view 2 of a powertrain according to an embodiment.
Figure 15:
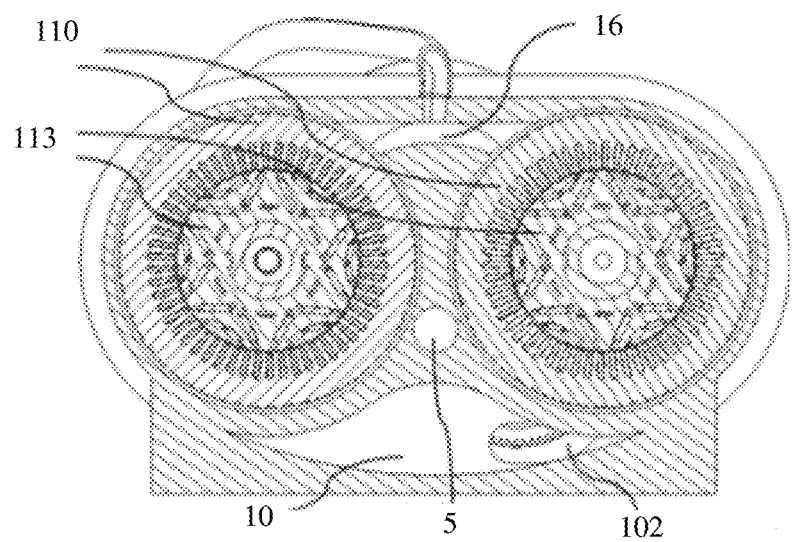
FIG. 15 is a schematic cross-sectional view 3 of a powertrain according to an embodiment.

Refer to FIG. 13 to FIG. 15. FIG. 13 is a schematic cross-sectional view 1 of a powertrain according to an embodiment. FIG. 14 is a schematic cross-sectional view 2 of a powertrain according to an embodiment. FIG. 15 is a schematic cross-sectional view 3 of a powertrain according to an embodiment.

A cross-sectional direction of FIG. 15 is perpendicular to cross-sectional directions of FIG. 13 and FIG. 14.

Bottom positions of the reducers on two sides are higher than the oil pan 10, so that cooling oil for cooling the reducers enters the oil pan 10 through reducer oil return ports 102. Oil of the powertrain accumulates at the bottom of the motors, and little oil accumulates at the bottom of the reducers. Gears of the two reducers churn little oil, so that oil churning losses of the gears of the reducers when the gears of the reducers rotate at a high speed can be effectively reduced to improve transmission efficiency.

In some other embodiments, when the powertrain includes two motors, the two motors may alternatively be disposed coaxially, that is, rotating shafts of the two motors are disposed in parallel, or the two motors share a rotating shaft. In this case, an operating principle of a cooling system and distribution of oil passages of the motors are similar to those described above. Details are not described herein again in this embodiment.

In conclusion, when this embodiment is applied to a dual-motor powertrain, the electronic oil pump and the mechanical oil pump jointly provide required cooling oil for the powertrain, to improve a cooling effect of the cooling system for the powertrain. The mechanical oil pump is a main oil pump, and the electronic oil pump is an auxiliary oil pump. The mechanical oil pump is rigidly connected to a transmission component of a reducer, so that the rotational speed of the mechanical oil pump is positively correlated to a rotational speed of a motor. When the rotational speed of the motor increases, the mechanical oil pump correspondingly increases the flow rate of cooling oil delivered to the powertrain, to meet a cooling requirement of the powertrain. The mechanical oil pump has a smaller size and can provide a greater flow rate of cooling oil than the electronic oil pump when the powertrain generates serious heat due to a high rotational speed of the motor. The electronic oil pump needs to provide required cooling oil only when the motor is blocked and when the motor runs at a low rotational speed, so that required performance of the electronic oil pump can be reduced, and an electronic oil pump with a smaller size and lower costs can be selected. In addition, when oil pans of the reducers are dry oil pans, cooling oil required by the reducers is provided by actively spraying cooling oil to the reducers, so that the reducers do not need to be cooled by churning oil by gears, which effectively reduces oil churning losses of the gears of the reducers during rotation at a high speed, and improves transmission efficiency of the reducers.

The following describes other implementations of the multi-motor powertrain. For the multi-motor powertrain, generally, all motors of a plurality of motors have a same rotational speed. A rotational speed of a motor in the following description represents a rotational speed of each motor, and a temperature of a motor in the following description represents a temperature of each motor.

Figure 16A:
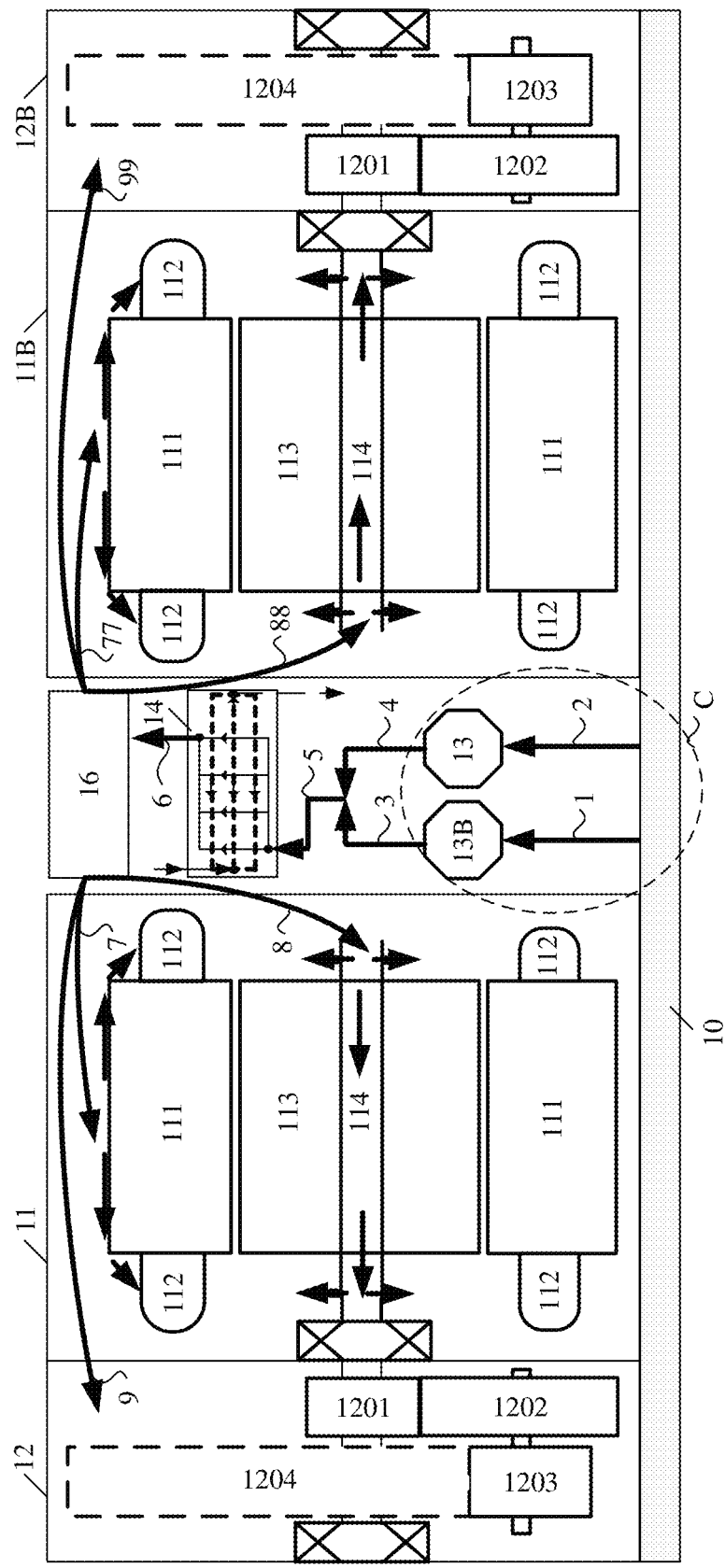
FIG. 16A is a schematic diagram of another powertrain according to an embodiment.

FIG. 16A is a schematic diagram of another powertrain according to an embodiment.

The powertrain shown in the figure includes a first motor 11, a second motor 11B, a first reducer 12, a second reducer 12B, and a cooling system.

The first motor 11 and the second motor 11B have a same implementation and operating principle, and the first reducer 12 and the second reducer 12B have a same implementation and operating principle.

The cooling system includes an electronic oil pump 13, an electronic oil pump 13B, a heat exchanger 14, and a cavity 16.

In this case, both electronic oil pumps are controlled by an MCU of an electric vehicle.

In some embodiments, a rotational speed of each electronic oil pump is positively correlated to a rotational speed of the motor. When the rotational speed of the motor increases, each electronic oil pump correspondingly increases a flow rate of cooling oil delivered to the powertrain, to meet a cooling requirement of the powertrain. The MCU may obtain rotational speed information of the motors by using a VCU. The MCU may alternatively measure the rotational speed of the motor 11 itself. A correspondence between the rotational speed of the electronic oil pump and the rotational speed of the motor is pre-calibrated. The correspondence may be stored in a form of a data table after calibrated or stored in a form of a function relationship after calibrated.

In some other embodiments, the rotational speed of each electronic oil pump is positively correlated to a temperature of the motor, and the MCU controls the rotational speed of each electronic oil pump based on a temperature of the motor detected in real time. A correspondence between the temperature of the motor and the rotational speed of the electronic oil pump may be pre-calibrated. The correspondence may be stored in a form of a data table after calibrated or stored in a form of a function relationship after calibrated.

Figure 16B:
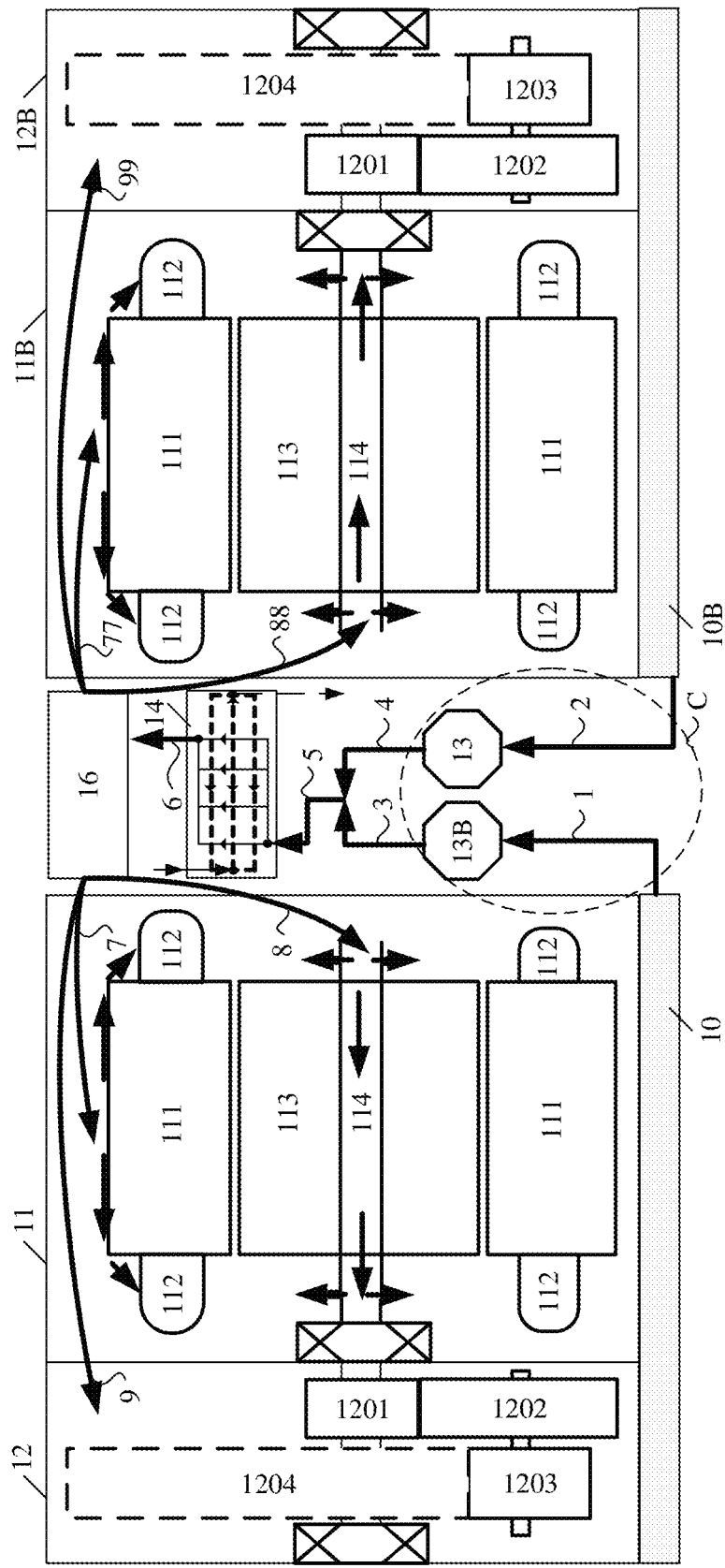
FIG. 16B is a schematic diagram of still another powertrain according to an embodiment.

FIG. 16B is a schematic diagram of another powertrain according to an embodiment.

In this case, in a possible implementation, a difference between the powertrain shown in FIG. 16B and that in FIG. 16A lies in that an oil pan of the powertrain is divided into two parts that do not communicate with each other, respectively corresponding to a first oil chamber 10 and a second oil chamber 10B in the figure.

In another possible implementation, a difference between the powertrain shown in FIG. 16B and that in FIG. 16A lies in that the powertrain includes two oil pans, a first oil pan includes a first oil chamber 10, and a second oil pan includes a second oil chamber 10B.

The following uses the second implementation as an example for description. A principle of the first implementation is similar thereto. Details are not described herein again in this embodiment. In this case, the first oil pan 10 includes a first reducer oil return port and a first motor oil return port, and the second oil pan 10B includes a second reducer oil return port and a second motor oil return port.

Cooling oil for cooling the first reducer 12 enters the first oil chamber 10 through the first reducer oil return port, cooling oil for cooling the first motor 11 enters the first oil chamber 10 through the first motor oil return port, cooling oil for cooling the second reducer 12B enters the second oil chamber 10B through the second reducer oil return port, and cooling oil for cooling the second motor 11B enters the second oil chamber 10B through the second motor oil return port.

In this implementation, the two oil chambers are separated, to prevent an oil suction flow rate of one electronic oil pump from decreasing due to uneven distribution of cooling oil in the oil pans when the electric vehicle is in a slope or turning state.

The electronic oil pump 13 sucks oil from the second oil chamber 10B through an oil passage 2, and the electronic oil pump 13B sucks oil from the first oil chamber 10 through an oil passage 1.

Figure 17:
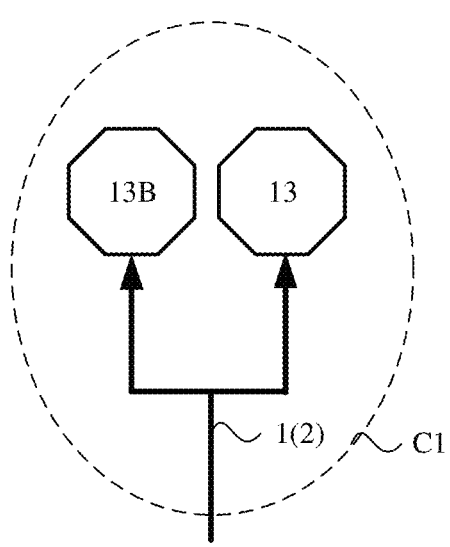
FIG. 17 is a schematic diagram 3 of an oil passage according to an embodiment.

In some other embodiments, refer to a schematic diagram 3 of an oil passage shown in FIG. 17. An area C1 in FIG. 17 corresponds to an area C in FIG. 16A. In this case, the electronic oil pump 13 and the electronic oil pump 13B share one suction port.

According to this embodiment, two electronic oil pumps suck oil. In some embodiments, an electronic oil pump with a small size and low costs may be selected for the two electronic oil pumps.

Figure 18A:
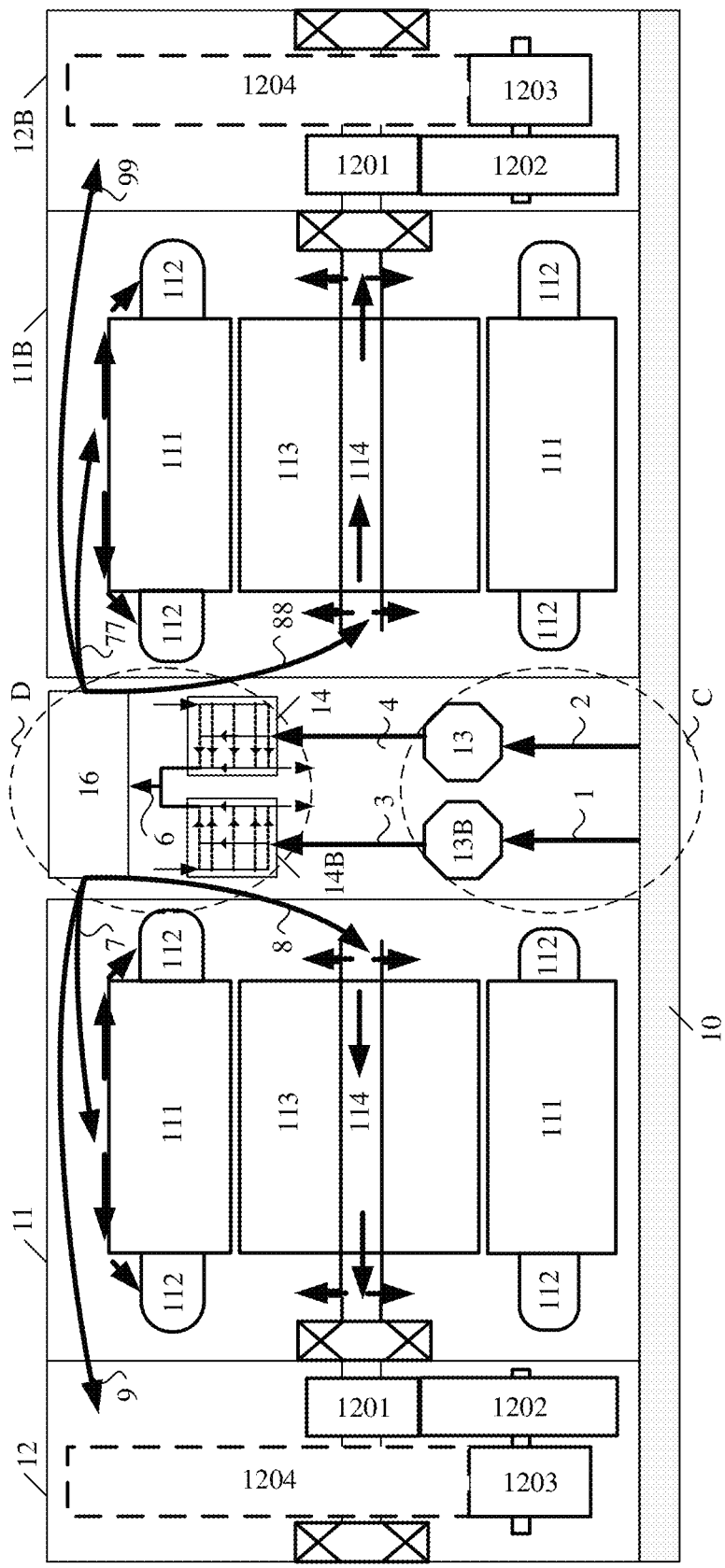
FIG. 18A is a schematic diagram of yet another powertrain according to an embodiment.

FIG. 18A is a schematic diagram of yet another powertrain according to an embodiment.

The powertrain shown in the figure differs from the powertrain shown in FIG. 16A in including two heat exchangers: a first heat exchanger 14 and a second heat exchanger 14B. An oil inlet port of the first heat exchanger 14 is connected to an oil passage 4 to cool cooling oil transmitted by the electronic oil pump 13, and an oil inlet port of the second heat exchanger 14B is connected to an oil passage 3 to cool cooling oil transmitted by the electronic oil pump 13B. The two heat exchangers respectively cool the cooling oil delivered by the two oil pumps, thereby improving a cooling effect of the cooling oil.

As shown in the figure, oil outlet ports of the first heat exchanger 14 and the second heat exchanger 14B converge and are connected to a cavity 16 by using an oil passage 6. In some other embodiments, refer to the implementation shown in FIG. 7C. In this case, an area B1 shown in FIG. 7C corresponds to an area D in FIG. 18. In this case, oil outlet passages of the two heat exchangers do not directly converge, to prevent cooling oil of one of the heat exchangers from flowing into the other heat exchanger due to high oil pressure at an oil outlet port caused by uneven distribution of oil accumulated in the oil pan 10 when the electric vehicle tilts.

For example, when the powertrain shown in FIG. 18A tilts to the left, oil pressure in a corresponding oil passage when the electronic oil pump 13B sucks oil is higher, and oil pressure at the oil outlet port of the second heat exchanger 14B is higher. As a result, cooling oil may flow into the first heat exchanger 14 through the oil passage 6 shown in FIG. 18A. When the implementation shown in FIG. 7C is used, the oil outlet ports of the two heat exchangers are separately connected to the cavity 16. Because the cavity 16 has a volume, pressure fluctuation in the cavity 16 is small, which prevents cooling oil from flowing backward.

Figure 18B:
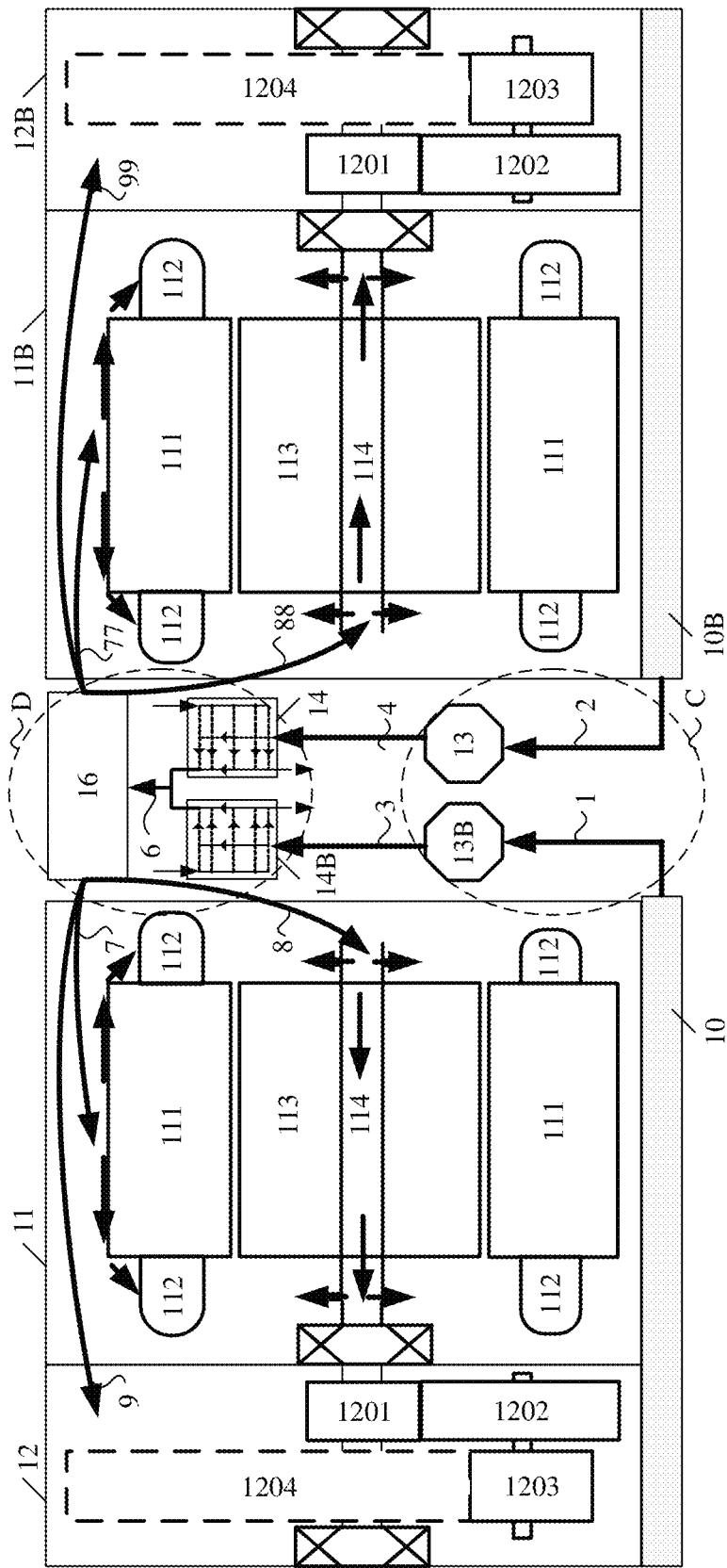
FIG. 18B is a schematic diagram of another powertrain according to an embodiment.

FIG. 18B is a schematic diagram of another powertrain according to an embodiment.

In this case, in a possible implementation, a difference between the powertrain shown in FIG. 18B and that in FIG. 18A lies in that a first oil chamber 10 and a second oil chamber 10B do not communicate with each other. For descriptions of the first oil chamber 10 and the second oil chamber 10B that are shown in the figure, refer to the foregoing embodiment.

The following describes an implementation of still another multi-motor powertrain.

Figure 19:
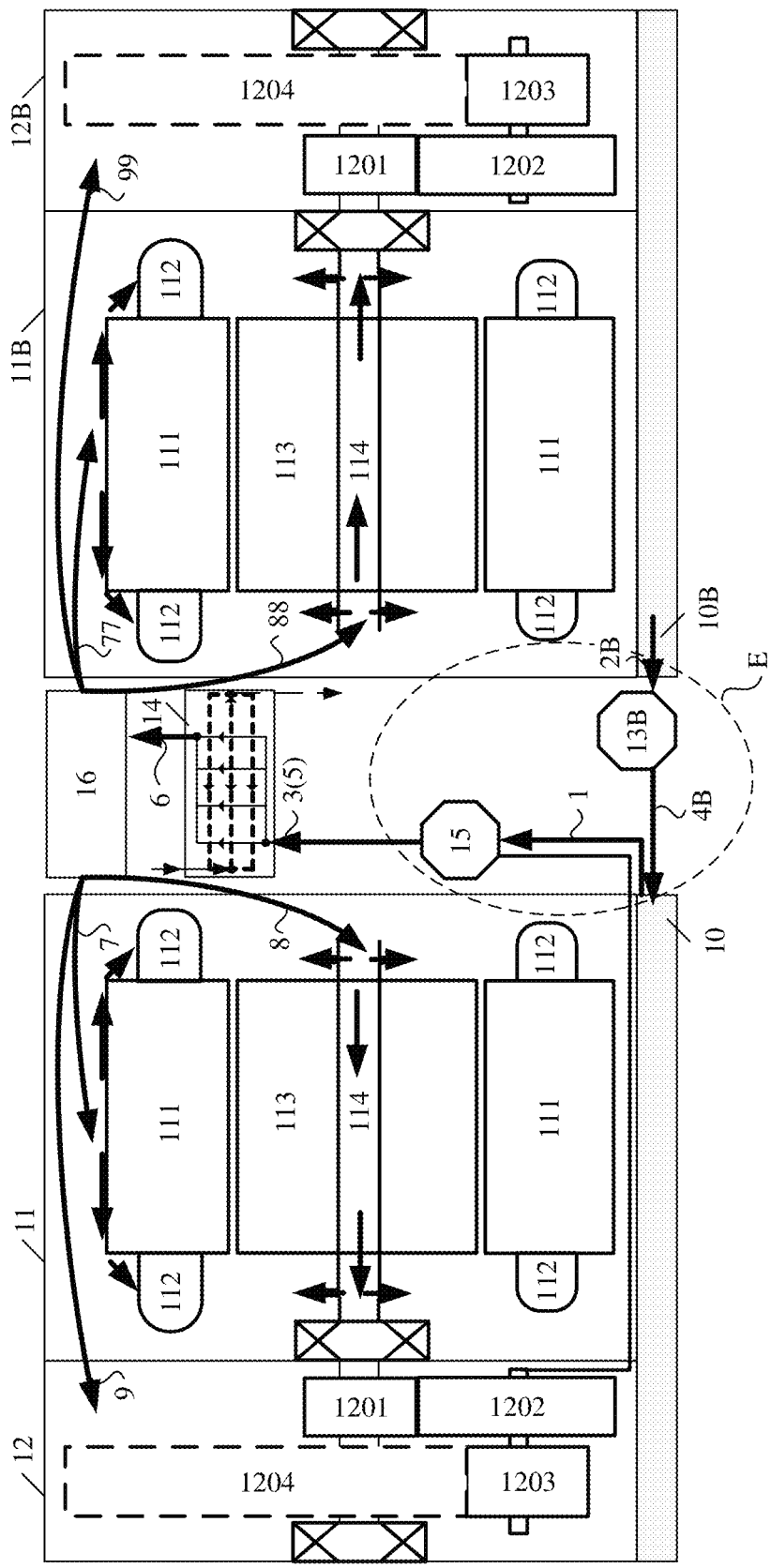
FIG. 19 is a schematic diagram of still another powertrain according to an embodiment.

FIG. 19 is a schematic diagram of still another powertrain according to an embodiment.

The powertrain shown in the figure includes a first motor 11, a second motor 11B, a first reducer 12, a second reducer 12B, and a cooling system. For descriptions of a first oil chamber 10 and a second oil chamber 10B that are shown in the figure, refer to the foregoing embodiment.

When two oil chambers are used, a total space occupied by two oil pans can be appropriately reduced, to reduce a space occupied by the powertrain. In this implementation, the two oil chambers do not communicate with each other, to avoid uneven distribution of cooling oil in the oil pans when an electric vehicle is in a slope or turning state.

The first motor 11 and the second motor 11B have a same implementation and operating principle, and the first reducer 12 and the second reducer 12B have a same implementation and operating principle.

The cooling system includes an electronic oil pump 13B, a mechanical oil pump 15, a heat exchanger 14, and a cavity 16.

The electronic oil pump 13B sucks oil from the second oil chamber 10B through an oil passage 2B and transmits the cooling oil to the first oil chamber 10 through an oil passage 4B. The mechanical oil pump 15 sucks oil from the first oil chamber 10.

Figure 20:
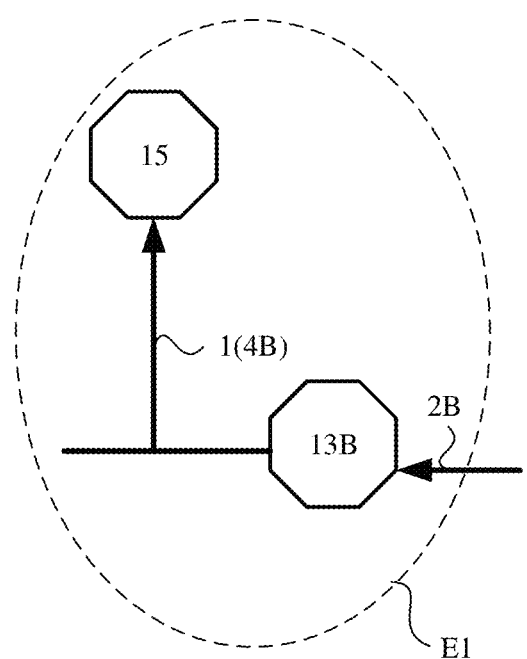
FIG. 20 is a schematic diagram 4 of an oil passage according to an embodiment.

In another possible implementation, refer to a schematic diagram 4 of an oil passage shown in FIG. 20. An area E1 in FIG. 20 corresponds to an area E in FIG. 19, and an oil outlet port of the electronic oil pump 13B and an oil suction port of the mechanical oil pump 15 converge. In this case, the mechanical oil pump 15 sucks oil from the first oil chamber 10 and the oil outlet port of the electronic oil pump 13B.

A rotational speed of the electronic oil pump 13B during operation is controlled by an MCU.

In some embodiments, the MCU controls the rotational speed of the electronic oil pump 13B based on a current rotational speed of the motor. The rotational speed of the electronic oil pump 13B is positively correlated to the rotational speed of the motor, and a correspondence between the rotational speed of the electronic oil pump 13B and the rotational speed of the motor is pre-calibrated. The correspondence may be stored in a form of a data table after calibrated or stored in a form of a function relationship after calibrated. A VCU generates corresponding rotational speed information based on the current rotational speed of the motor of the electric vehicle, and the VCU sends the rotational speed information to the MCU, so that the MCU controls an operating status of the electronic oil pump 13B. The MCU may alternatively measure the rotational speed of the motor itself.

In some other embodiments, the MCU monitors a temperature of the motor in real time and controls the operating status of the electronic oil pump 13B based on the temperature of the motor. The rotational speed of the electronic oil pump 13B is positively correlated to the temperature of the motor, and a correspondence between the temperature of the motor and the rotational speed of the electronic oil pump 13B may be pre-calibrated and stored. The correspondence may be stored in a form of a data table after calibrated or stored in a form of a function relationship after calibrated.

The following describes an implementation of another multi-motor powertrain.

Figure 21:
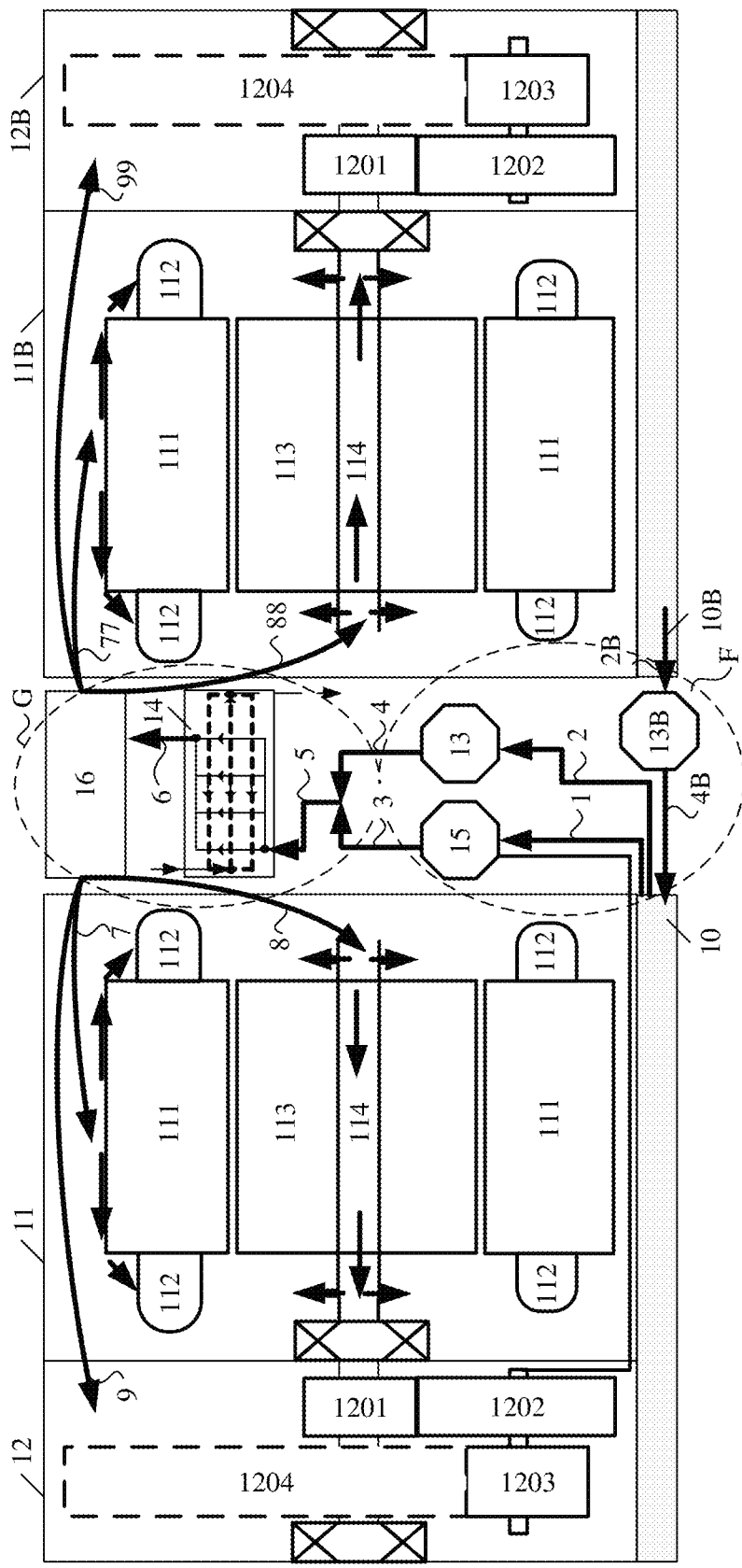
FIG. 21 is a schematic diagram of yet another powertrain according to an embodiment.

FIG. 21 is a schematic diagram of yet another powertrain according to an embodiment.

The powertrain shown in the figure includes a first motor 11, a second motor 11B, a first reducer 12, a second reducer 12B, and a cooling system. The first motor 11 and the second motor 11B have a same implementation and operating principle, and the first reducer 12 and the second reducer 12B have a same implementation and operating principle.

The cooling system includes two electronic oil pumps: a first electronic oil pump 13 and a second electronic oil pump 13B, and further includes a mechanical oil pump 15, as well as a heat exchanger 14 and a cavity 16.

For descriptions of a first oil chamber 10 and a second oil chamber 10B that are shown in the figure, refer to the foregoing embodiment.

The second electronic oil pump 13B sucks oil from the second oil chamber 10B through an oil passage 2B and transmits the cooling oil to the first oil chamber 10 through an oil passage 4B. The mechanical oil pump 15 sucks oil from the first oil chamber 10 through an oil passage 1. The first electronic oil pump 13 sucks oil from the first oil chamber 10 through an oil passage 2.

A one-way valve is disposed in the first electronic oil pump 13, to prevent high-pressure cooling oil in the oil passage 3 from being diverted to the oil passage 4 and damaging the first electronic oil pump 13 when the mechanical oil pump 15 has a large oil suction flow rate due to a high rotational speed of the first motor 11.

When the motor is blocked, an electric vehicle is stationary and the rotational speed of the motor is zero. In this case, a rotating shaft of the reducer 12 does not rotate, and the mechanical oil pump 15 does not suck oil. In this case, the first electronic oil pump 13 and the second electronic oil pump 13B are started, and oil passages 2B, 4B, 2, 4, 5, 6, 7, 77, 8, 88, 9, and 99 are turned on. Transmitted cooling oil takes away heat generated by the blocked motor, and a coolant flowing through the heat exchanger 14 absorbs heat of the cooling oil and is heated.

In some embodiments, a motor blocking scenario usually occurs when the electric vehicle is started in a cold environment. The heated coolant flows through a power battery pack of the electric vehicle via a pipe, to heat the power battery pack, and improve discharge performance of the power battery pack.

When the electric vehicle is running, the rotational speed of the motor is not zero. In this case, a flow rate of cooling oil delivered by the mechanical oil pump 15 to the powertrain is positively correlated to a rotational speed of the rotating shaft, that is, the rotational speed of the first motor 11. Therefore, when the rotational speed of the first motor 11 increases, which increases heat generated by the powertrain, the mechanical oil pump 15 correspondingly increases the flow rate of cooling oil delivered to the powertrain, to meet a cooling requirement of the powertrain.

Rotational speeds of the first electronic oil pump 13 and the second electronic oil pump 13B during operation are controlled by an MCU.

For a manner in which the MCU controls the first electronic oil pump 13, refer to related descriptions corresponding to FIG. 5 and FIG. 6. Details are not described herein again in this embodiment.

The following describes a manner in which the MCU controls the second electronic oil pump 13B.

In some embodiments, the MCU determines the rotational speed of the second electronic oil pump 13B based on a current total oil suction flow rate of the first electronic oil pump 13 and the mechanical oil pump 15. The rotational speed of the second electronic oil pump 13B is positively correlated to the total oil suction flow rate, and a correspondence between the total oil suction flow rate and the rotational speed of the second electronic oil pump 13B is pre-calibrated. The correspondence may be stored in a form of a data table after calibrated or stored in a form of a function relationship after calibrated. In this case, a larger total oil suction flow rate indicates that an oil suction flow rate of the second electronic oil pump 13B increases correspondingly.

In an actual application, the MCU generally controls the oil suction flow rate of the second electronic oil pump 13B to be equal to half of the total oil suction flow rate, so as to maintain a basically same flow rate of cooling oil in the first oil chamber 10 and the second oil chamber 10B.

In some other embodiments, the MCU determines the rotational speed of the second electronic oil pump 13B with reference to a current rotational speed of the first electronic oil pump 13 and a current rotational speed of the mechanical oil pump 15. A relationship between the rotational speed of the second electronic oil pump 13B, the rotational speed of the first electronic oil pump 13, and the rotational speed of the mechanical oil pump 15 is pre-calibrated. The rotational speed of the second electronic oil pump is positively correlated to a sum of the current rotational speed of the first electronic oil pump and the current rotational speed of the mechanical oil pump, to maintain a basically same flow rate of cooling oil in the first oil chamber 10 and the second oil chamber 10B.

Figure 22:
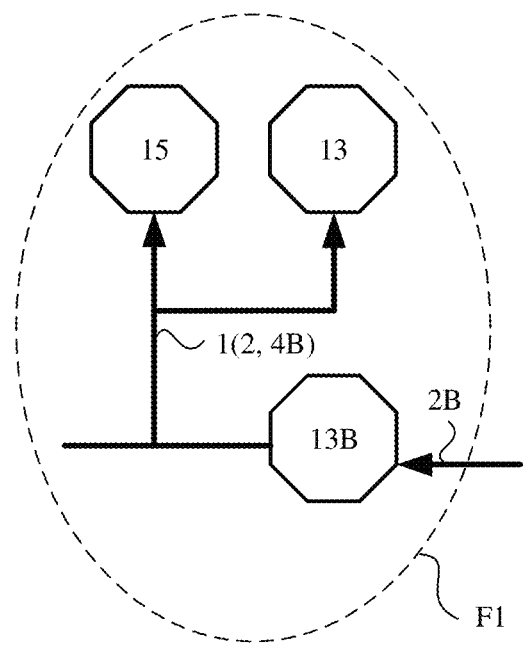
FIG. 22 is a schematic diagram 5 of an oil passage according to an embodiment.

FIG. 22 is a schematic diagram 5 of an oil passage.

An area F1 in FIG. 22 corresponds to an area F in FIG. 21. In this case, oil suction ports of the mechanical oil pump 15 and the first electronic oil pump 13 converge, and then converge with an oil outlet port of the second electronic oil pump 13B. The mechanical oil pump 15 and the first electronic oil pump 13 suck oil from the first oil chamber 10 and the oil outlet port of the second electronic oil pump 13B.

Figure 23:
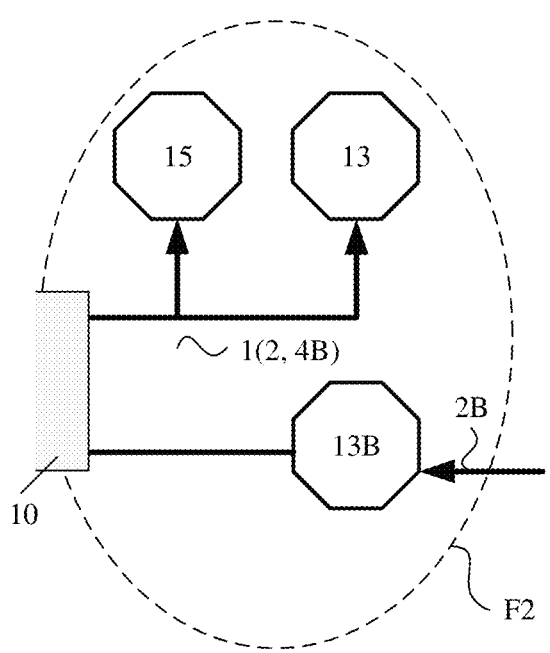
FIG. 23 is a schematic diagram 6 of an oil passage according to an embodiment.

FIG. 23 is a schematic diagram 6 of an oil passage.

An area F2 in FIG. 23 corresponds to the area F in FIG. 21. In this case, the oil suction ports of the mechanical oil pump 15 and the first electronic oil pump 13 converge, and both suck oil from the first oil chamber 10.

An area G in FIG. 21 may alternatively be implemented in the manner shown in FIG. 7C, that is, the powertrain is provided with two heat exchangers to respectively cool cooling oil delivered by the two oil pumps, thereby improving a cooling effect of the cooling oil. A first heat exchanger 14 is connected to the cavity 16 by using an oil passage 6, and a second heat exchanger 14B is connected to the cavity 16 by using an oil passage 6B. Oil outlet passages of the two heat exchangers shown in FIG. 7C do not directly converge, to prevent cooling oil of the second heat exchanger 14B from flowing into the first heat exchanger 14 due to high oil pressure at an oil outlet port caused by a high rotational speed of the motor 11. In some other embodiments, the oil outlet passages of the two heat exchangers may alternatively first converge and then connect to the cavity 16.

Figure 24:
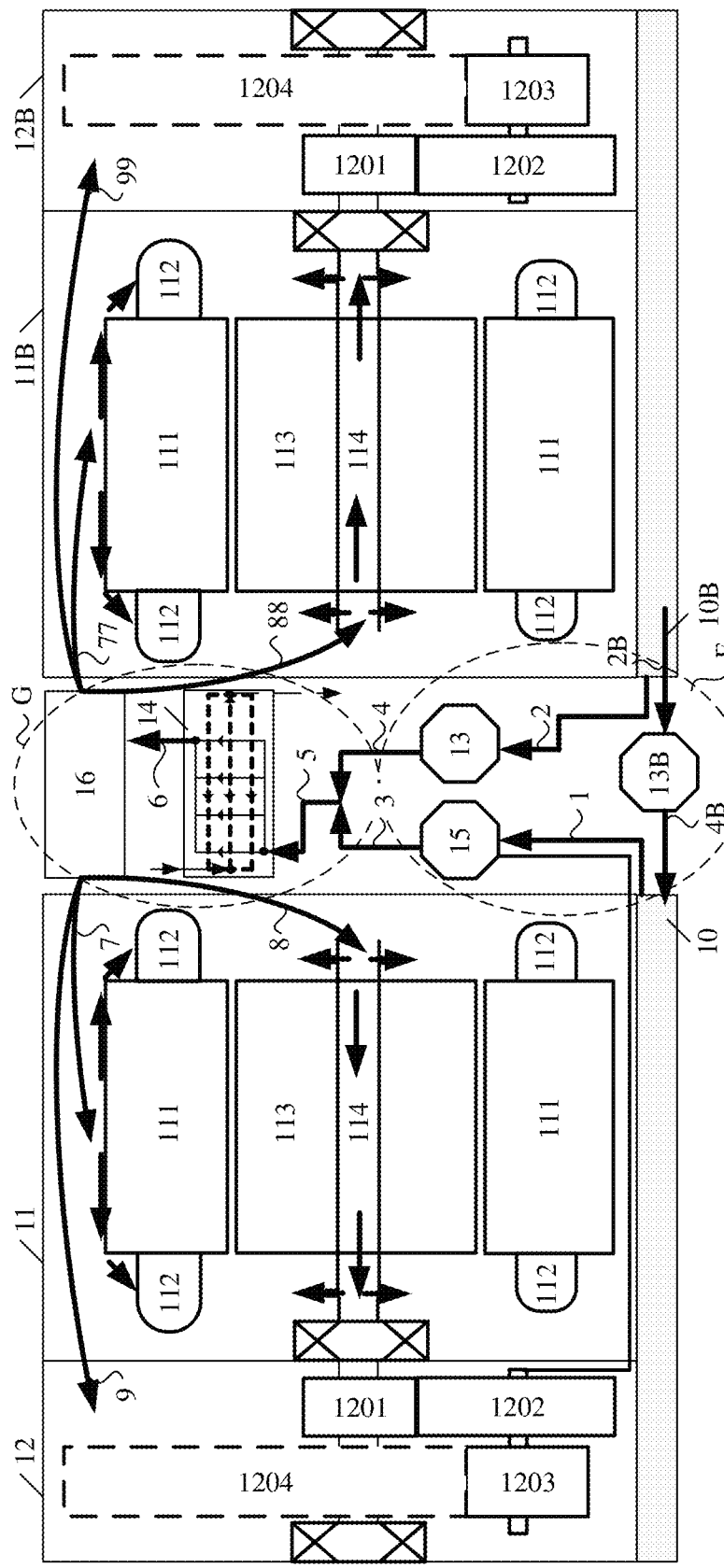
FIG. 24 is a schematic diagram of another powertrain according to an embodiment.

FIG. 24 is a schematic diagram of another powertrain according to an embodiment.

A difference between the powertrain shown in FIG. 24 and that in FIG. 21 lies in that the electronic oil pump 13 sucks oil from the second oil chamber 10B. The first electronic oil pump 13 and the second electronic oil pump 13B may have oil suction ports independent of each other or may share one oil suction port. This is not limited in this embodiment.

For a manner in which an MCU controls the first electronic oil pump 13, refer to related descriptions corresponding to FIG. 5 and FIG. 6. Details are not described herein again in this embodiment.

The following describes a manner in which the MCU controls the second electronic oil pump 13B.

When the motor is blocked, an electric vehicle is stationary and the rotational speed of the motor is zero. In this case, the MCU controls the second electronic oil pump 13B to operate by rotating reversely at a full rotational speed to transmit cooling oil in the first oil chamber 10 to the second oil chamber 10B, so as to maintain a basically same flow rate of cooling oil in the first oil chamber 10 and the second oil chamber 10B.

When the electric vehicle is running, the MCU determines a rotational speed of the second electronic oil pump 13B based on a current oil suction flow rate difference between the first electronic oil pump 13 and the mechanical oil pump 15. The rotational speed of the second electronic oil pump 13B is positively correlated to the oil suction flow rate difference, and the correspondence between the rotational speed of the second electronic oil pump 13B and the oil suction flow rate difference is pre-calibrated. The correspondence may be stored in a form of a data table after calibrated or stored in a form of a function relationship after calibrated.

In an actual application, the MCU controls the rotational speed of the second electronic oil pump 13B so that an oil suction flow rate of the second electronic oil pump 13B is equal to half of the oil suction flow rate difference, so as to maintain a basically same flow rate of cooling oil in the first oil chamber 10 and the second oil chamber 10B.

In conclusion, when the solution provided in this embodiment is applied to a multi-motor powertrain, the electronic oil pump and the mechanical oil pump jointly provide required cooling oil for the powertrain, to improve a cooling effect of the cooling system for the powertrain. The mechanical oil pump is a main oil pump, and the electronic oil pump is an auxiliary oil pump. The mechanical oil pump is rigidly connected to a transmission component of a reducer, so that the rotational speed of the mechanical oil pump is positively correlated to a rotational speed of a motor. When the rotational speed of the motor increases, the mechanical oil pump correspondingly increases the flow rate of cooling oil delivered to the powertrain, to meet a cooling requirement of the powertrain. The mechanical oil pump has a smaller size and can provide a greater flow rate of cooling oil than the electronic oil pump when the powertrain generates serious heat due to a high rotational speed of the motor. One electronic oil pump needs to provide required cooling oil only when the motor is blocked and when the motor runs at a low rotational speed, and the other electronic oil pump needs to transmit cooling oil only between oil pans on two sides, so that required performance of the electronic oil pump can be reduced, and an electronic oil pump with a smaller size and lower costs can be selected. In addition, when oil pans of the reducers are dry oil pans, cooling oil required by the reducers is provided by actively spraying cooling oil to the reducers, so that the reducers do not need to be cooled by churning oil by gears, which effectively reduces oil churning losses of the gears of the reducers during rotation at a high speed, and improves transmission efficiency of the reducers.

Based on the powertrain provided in the foregoing embodiment, an embodiment further provides an electric vehicle to which the powertrain is applied, which is described below with reference to an accompanying drawing.

Figure 25:
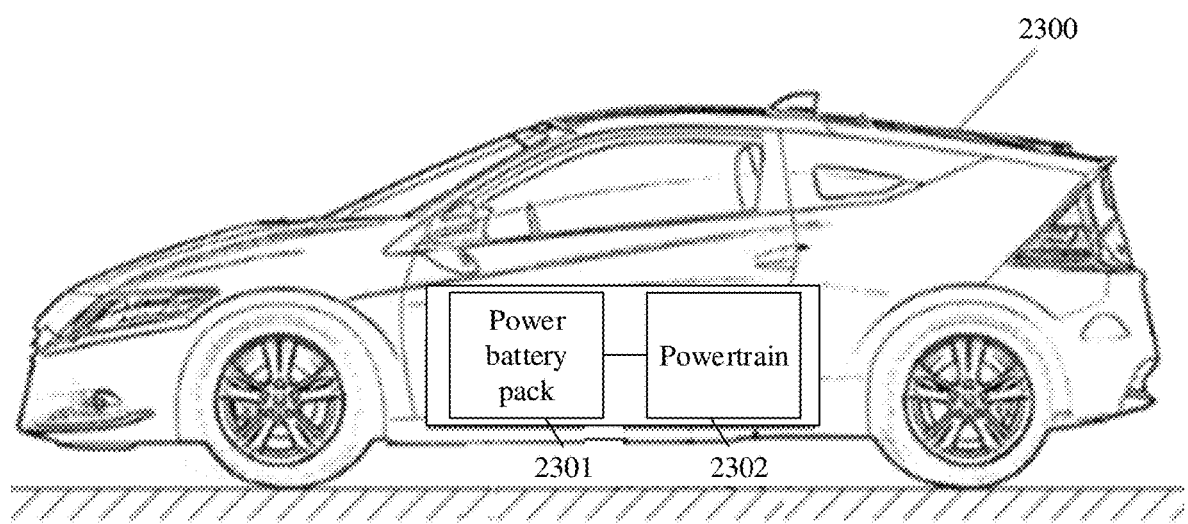
FIG. 25 is a schematic diagram of an electric vehicle according to an embodiment.

FIG. 25 is a schematic diagram of an electric vehicle according to an embodiment.

The electric vehicle 2300 provided in this embodiment includes a power battery pack 2301 and a powertrain 2302.

The power battery pack 2301 is configured to supply required electric energy to the powertrain 2302. The powertrain 2302 is configured to convert the electrical energy supplied by the power battery pack into mechanical energy to drive the electric vehicle.

The powertrain 2302 may be a single-motor powertrain or a multi-motor powertrain. This is not limited in this embodiment.

For an implementation of the powertrain 2302, refer to related descriptions in the foregoing embodiments. Details are not described herein again in this embodiment.

In conclusion, according to this embodiment, a plurality of oil pumps may jointly provide required cooling oil for the powertrain, to ensure that a sufficient flow rate of cooling oil can be provided. A part of the cooling oil transmitted by the plurality of oil pumps is used to cool a motor, and another part is used to cool a reducer, to ensure good heat dissipation of the powertrain, and improve a cooling effect of a cooling system for the powertrain.

When an electronic oil pump and a mechanical oil pump jointly provide the required cooling oil for the powertrain, the mechanical oil pump is a main oil pump, and the electronic oil pump is an auxiliary oil pump. The mechanical oil pump is rigidly connected to a transmission component of the reducer, so that a rotational speed of the mechanical oil pump is positively correlated to a rotational speed of the motor. When the rotational speed of the motor increases, the mechanical oil pump correspondingly increases a flow rate of cooling oil delivered to the powertrain, to meet a cooling requirement of the powertrain. The mechanical oil pump has a smaller size and can provide a greater flow rate of cooling oil than the electronic oil pump when the powertrain generates serious heat due to a high rotational speed of the motor. The electronic oil pump needs to provide required cooling oil only when the motor is blocked and when the motor runs at a low rotational speed, so that required performance of the electronic oil pump can be reduced, and an electronic oil pump with a smaller size and lower costs can be selected.

In some other embodiments, a plurality of electronic oil pumps may provide the required cooling oil for the powertrain, to reduce a performance requirement on each electronic oil pump, so that a plurality of electronic oil pump with a small size and low costs may be selected.

In the foregoing descriptions of the embodiments, the correspondence that is pre-calibrated and stored may be stored in a form of a data table and is determined by searching the data table when the correspondence is to be used. Alternatively, the correspondence that is pre-calibrated and stored may be stored in a form of a function relationship, the function relationship is invoked when the correspondence is to be used, and a result is determined through calculation.

It should be understood that "at least one" means one or more, and "a plurality of" means two or more. The term "and/or" is used to describe an association relationship between associated objects and indicates that three relationships may exist. For example, "A and/or B" may indicate the following three cases: only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

The embodiments are all described in a progressive manner, for same or similar parts in the embodiments, refer to these embodiments, and each embodiment focuses on a difference from other embodiments. The apparatus embodiment described above is merely an example, the units and modules described as separate parts may or may not be physically separate. In addition, some or all of the units and modules may be selected based on actual requirements to achieve the objectives of the embodiments. A person of ordinary skill in the art may understand and implement the embodiments without creative efforts.

The foregoing descriptions are merely implementations of the embodiments. It should be noted that a person of ordinary skill in the art may make several improvements or polishing without departing from the principle and the improvements or polishing shall fall within the scope of the embodiments.

What is claimed is:

1. A powertrain, configured to drive an electric vehicle, the powertrain comprising:
    a motor;
    a reducer;
    an oil pan; and
    a cooling system comprising at least one heat exchanger and at least two oil pumps;
    the at least two oil pumps are configured to suck cooling oil from the oil pan, and deliver the cooling oil to the heat exchanger;
    the at least one heat exchanger is configured to cool the cooling oil sucked by the at least two oil pumps; and
    an oil outlet port of the at least one heat exchanger is connected to an oil passage in the motor and an oil passage in the reducer, so that a part of the cooling oil cools the motor through the oil passage in the motor, and another part of the cooling oil cools the reducer through the oil passage in the reducer.

2. The powertrain according to claim 1, further comprising:
    one motor; and
    one reducer, and the oil pan further comprises:
    a reducer oil return port; and
    a motor oil return port; and
    cooling oil for cooling the reducer enters the oil pan through the reducer oil return port, and cooling oil for cooling the motor enters the oil pan through the motor oil return port.

3. The powertrain according to claim 2, further comprising:
    a motor control unit (MCU), and the at least two oil pumps further comprise:
    a mechanical oil pump; and
    an electronic oil pump;
    the mechanical oil pump and the electronic oil pump each comprise an oil suction port, or the mechanical oil pump and the electronic oil pump share one oil suction port;
    oil outlet passages of the mechanical oil pump and the electronic oil pump converge and then are connected to an oil inlet port of a same heat exchanger, or the oil outlet passages of the mechanical oil pump and the electronic oil pump are respectively connected to oil inlet ports of different heat exchangers;
    the mechanical oil pump is driven by a rotating component of the powertrain, and the rotating component of the powertrain comprises a rotating shaft of the motor or a rotating shaft of the reducer; and
    the MCU is configured to control a rotational speed of the electronic oil pump.

4. The powertrain according to claim 2, further comprising:
    a motor control unit (MCU), and the at least two oil pumps further comprise:
    two electronic oil pumps;
    the two electronic oil pumps each comprise an oil suction port, or the two electronic oil pumps share one oil suction port;
    oil outlet passages of the two electronic oil pumps converge and then are connected to an oil inlet port of a same heat exchanger, or the oil outlet passages of the two electronic oil pumps are respectively connected to oil inlet ports of different heat exchangers; and
    the MCU is configured to control rotational speeds of the two electronic oil pumps.

5. The powertrain according to claim 1, wherein the motor further comprises:
    a first motor; and
    a second motor, the reducer further comprises:
    a first reducer; and
    a second reducer, and the oil pan further comprises:
    a reducer oil return port; and
    a motor oil return port;
    the first reducer is connected to the first motor, and the second reducer is connected to the second motor; and
    cooling oil for cooling the first reducer and the second reducer enters the oil pan through the reducer oil return port, and cooling oil for cooling the first motor and the second motor enters the oil pan through the motor oil return port.

6. The powertrain according to claim 5, further comprising:
    a motor control unit (MCU), and the at least two oil pumps further comprise:
    a mechanical oil pump; and
    an electronic oil pump;
    the mechanical oil pump and the electronic oil pump each comprise an oil suction port, or the mechanical oil pump and the electronic oil pump share one oil suction port;
    oil outlet passages of the mechanical oil pump and the electronic oil pump converge and then are connected to an oil inlet port of a same heat exchanger, or the oil outlet passages of the mechanical oil pump and the electronic oil pump are respectively connected to oil inlet ports of different heat exchangers;
    the mechanical oil pump is driven by a rotating component of the powertrain, and the rotating component of the powertrain comprises a rotating shaft of the first motor, a rotating shaft of the second motor, a rotating shaft of the first reducer, or a rotating shaft of the second reducer; and the MCU is configured to control a rotational speed of the electronic oil pump.

7. The powertrain according to claim 5, further comprising:
a motor control unit (MCU), and the at least two oil pumps further comprise:
two electronic oil pumps;
the two electronic oil pumps each comprise an oil suction port, or the two electronic oil pumps share one oil suction port;
oil outlet passages of the two electronic oil pumps converge and then are connected to an oil inlet port of a same heat exchanger, or are respectively connected to oil inlet ports of different heat exchangers; and
the MCU is configured to control rotational speeds of the two electronic oil pumps.

8. The powertrain according to claim 1, further comprising:
a first motor;
a second motor;
a first reducer; and
a second reducer; the oil pan further comprises:
a reducer oil return port; and
a motor oil return port, and the oil pan further comprises:
a first oil chamber; and
a second oil chamber that do not communicate with each other;
the first reducer is connected to the first motor, and the second reducer is connected to the second motor; and
cooling oil for cooling the first reducer enters the first oil chamber through the reducer oil return port, cooling oil for cooling the first motor enters the first oil chamber through the motor oil return port, cooling oil for cooling the second reducer enters the second oil chamber through the reducer oil return port, and cooling oil for cooling the second motor enters the second oil chamber through the motor oil return port.

9. The powertrain according to claim 1, further comprising:
a first motor;
a second motor;
a first reducer;
a second reducer;
a first oil pan; and
a second oil pan that do not communicate with each other, the first oil pan comprises a first reducer oil return port and a first motor oil return port, the second oil pan comprises a second reducer oil return port and a second motor oil return port, the first oil pan comprises a first oil chamber, and the second oil pan comprises a second oil chamber;
the first reducer is connected to the first motor, and the second reducer is connected to the second motor; and
cooling oil for cooling the first reducer enters the first oil chamber through the first reducer oil return port, cooling oil for cooling the first motor enters the first oil chamber through the first motor oil return port, cooling oil for cooling the second reducer enters the second oil chamber through the second reducer oil return port, and cooling oil for cooling the second motor enters the second oil chamber through the second motor oil return port.

10. The powertrain according to claim 8, further comprising:
a motor control unit (MCU), and the at least two oil pumps further comprise:
two electronic oil pumps;
one of the two electronic oil pumps sucks oil from the first oil chamber, and the other electronic oil pump sucks oil from the second oil chamber;
oil outlet passages of the two electronic oil pumps converge and then are connected to an oil inlet port of a same heat exchanger, or are respectively connected to oil inlet ports of different heat exchangers; and
the MCU is configured to control rotational speeds of the two electronic oil pumps.

11. The powertrain according to claim 8, further comprising:
a motor control unit (MCU), and the at least two oil pumps further comprise:
a mechanical oil pump; and
an electronic oil pump;
an oil suction port of the electronic oil pump is connected to the second oil chamber, and an oil outlet passage of the electronic oil pump is connected to the first oil chamber;
the mechanical oil pump is driven by a rotating component of the powertrain, and the rotating component of the powertrain comprises a rotating shaft of the first motor or a rotating shaft of the first reducer;
an oil suction port of the mechanical oil pump is connected to the first oil chamber, or the oil suction port of the mechanical oil pump is connected to the first oil chamber and the oil outlet passage of the electronic oil pump, and an oil outlet passage of the mechanical oil pump is connected to an oil inlet port of the heat exchanger; and
the MCU is configured to control a rotational speed of the electronic oil pump.

12. The powertrain according to claim 8, further comprising:
a motor control unit (MCU), and the at least two oil pumps further comprise:
a mechanical oil pump;
a first electronic oil pump; and
a second electronic oil pump;
the mechanical oil pump is driven by a rotating component of the powertrain, and the rotating component of the powertrain comprises a rotating shaft of the first motor or a rotating shaft of the first reducer;
oil suction ports of the mechanical oil pump and the first electronic oil pump are connected to the first oil chamber;
the mechanical oil pump and the first electronic oil pump each comprise an oil suction port, or the mechanical oil pump and the first electronic oil pump share one oil suction port;
oil outlet passages of the mechanical oil pump and the first electronic oil pump converge and then are connected to an oil inlet port of a same heat exchanger, or are respectively connected to oil inlet ports of different heat exchangers;
an oil suction port of the second electronic oil pump is connected to the second oil chamber;
an oil outlet passage of the second electronic oil pump is connected to the first oil chamber, or the oil outlet passage of the second electronic oil pump is connected to the first oil chamber and the oil suction port of the mechanical oil pump; and the MCU is configured to control rotational speeds of the first electronic oil pump and the second electronic oil pump.

13. The powertrain according to claim 8, further comprising:
a motor control unit (MCU), and the at least two oil pumps further comprise:
a mechanical oil pump;
a first electronic oil pump; and
a second electronic oil pump;
the mechanical oil pump is driven by a rotating component of the powertrain, and the rotating component of the powertrain comprises a rotating shaft of the first motor or a rotating shaft of the first reducer;
an oil suction port of the mechanical oil pump is connected to the first oil chamber, and an oil outlet passage of the mechanical oil pump and an oil outlet passage of the first electronic oil pump converge and then are connected to an oil inlet port of a same heat exchanger, or the oil outlet passage of the mechanical oil pump and the oil outlet passage of the first electronic oil pump are respectively connected to oil inlet ports of different heat exchangers;
oil suction ports of the first electronic oil pump and the second electronic oil pump are connected to the second oil chamber, and the first electronic oil pump and the second electronic oil pump have oil suction ports independent of each other, or share one oil suction port;
an oil outlet passage of the second electronic oil pump is connected to the first oil chamber, or the oil outlet passage of the second electronic oil pump is connected to the first oil chamber and the oil suction port of the mechanical oil pump; and
the MCU is configured to control rotational speeds of the first electronic oil pump and the second electronic oil pump.

14. The powertrain according to claim 2, wherein the cooling system further comprises:
a cavity, and the oil outlet port of the heat exchanger is connected to the oil passage in the motor and the oil passage in the reducer by using the cavity.

15. The powertrain according to claim 3, wherein the MCU is configured to: when the motor is blocked, control the electronic oil pump to operate by rotating forward at a full rotational speed; and when the electric vehicle is running, determine the rotational speed of the electronic oil pump based on a current temperature of the motor.

16. The powertrain according to claim 3, wherein the MCU is configured to:
when the motor is blocked, control the electronic oil pump to operate by rotating forward at a full rotational speed;
when the electric vehicle is running and a current rotational speed of the motor is less than or equal to an inflection-point rotational speed of the motor, control the electronic oil pump to operate by rotating forward at the full rotational speed; and
when the electric vehicle is running and the current rotational speed of the motor is greater than the inflection-point rotational speed of the motor, control the rotational speed of the electronic oil pump to gradually decrease, wherein the inflection-point rotational speed is a rotational speed that is of the motor and that corresponds to an intersection between a relationship curve between rated output torque of the motor and a rotational speed of the motor, and a relationship curve between rated output power of the motor and the rotational speed of the motor.

17. The powertrain according to claim 3, wherein the MCU is configured to:
when the motor is blocked, control the electronic oil pump to operate by rotating forward at a full rotational speed; and
when the electric vehicle is running, control the rotational speed of the electronic oil pump based on a current rotational speed of the motor, wherein the rotational speed of the electronic oil pump is negatively correlated to the current rotational speed of the motor.

18. The powertrain according to claim 4, wherein the MCU is configured to:
when the motor is blocked, control the two electronic oil pumps to operate by rotating forward at a full rotational speed; and
when the electric vehicle is running, control the rotational speeds of the two electronic oil pumps based on a current rotational speed of the motor, wherein the rotational speeds of the two electronic oil pumps are positively correlated to the current rotational speed of the motor; or
when the electric vehicle is running, control the rotational speeds of the two electronic oil pumps based on a current temperature of the motor, wherein the rotational speeds of the two electronic oil pumps are positively correlated to the current temperature of the motor.

19. The powertrain according to claim 11, wherein the MCU is configured to:
control the rotational speed of the electronic oil pump based on a current rotational speed of the motor, wherein the rotational speed of the electronic oil pump is positively correlated to the rotational speed of the motor; or control the rotational speed of the electronic oil pump based on a current temperature of the motor, wherein the rotational speed of the electronic oil pump is positively correlated to the current temperature of the motor.

20. An electric vehicle, the electric vehicle comprising a powertrain, wherein the powertrain comprises:
a motor;
a reducer;
an oil pan; and
a cooling system, and the cooling system comprises at least one heat exchanger and at least two oil pumps;
the at least two oil pumps are configured to suck cooling oil from the oil pan, and deliver the cooling oil to the heat exchanger;
the at least one heat exchanger is configured to cool the cooling oil sucked by the at least two oil pumps; and
an oil outlet port of the at least one heat exchanger is connected to an oil passage in the motor and an oil passage in the reducer, so that a part of the cooling oil cools the motor through the oil passage in the motor, and another part of the cooling oil cools the reducer through the oil passage in the reducer;
and the electric vehicle further comprises a power battery pack;
the power battery pack is configured to supply electric energy to the powertrain; and
the powertrain is configured to convert the electrical energy supplied by the power battery pack into mechanical energy to drive the electric vehicle.

* * * * *